US012322324B2

(12) United States Patent
Kim et al.

(10) Patent No.: US 12,322,324 B2
(45) Date of Patent: Jun. 3, 2025

(54) DISPLAY DEVICE AND METHOD OF DRIVING THE SAME

(71) Applicant: Samsung Display Co., LTD., Yongin-si (KR)

(72) Inventors: Jihye Kim, Yongin-si (KR); Yu-Chol Kim, Yongin-si (KR); Jin-Wook Yang, Yongin-si (KR); Seongoh Yeom, Yongin-si (KR); Eui-Myeong Cho, Yongin-si (KR); Jakyoung Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 65 days.

(21) Appl. No.: 18/370,445

(22) Filed: Sep. 20, 2023

(65) Prior Publication Data

US 2024/0144861 A1 May 2, 2024

(30) Foreign Application Priority Data

Oct. 28, 2022 (KR) ........................ 10-2022-0141642

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/061* (2013.01); *G09G 2310/08* (2013.01); *G09G 2320/0233* (2013.01); *G09G 2320/0247* (2013.01)

(58) Field of Classification Search
CPC ............. G09G 3/32; G09G 2300/0819; G09G 2300/0852; G09G 2310/061; G09G 2310/08; G09G 2320/0233; G09G 2320/0247; G09G 2310/0286; G09G 3/3233; G09G 3/3266; G09G 2310/0251; G09G 2340/0435; G09G 3/20; G09G 3/30; G09G 2300/0809
See application file for complete search history.

(56) References Cited

U.S. PATENT DOCUMENTS 11,263,976 B2 3/2022 Yang et al.
2021/0248961 A1 * 8/2021 Yang .................... G09G 3/3233

FOREIGN PATENT DOCUMENTS

KR 1020220068778 A 5/2022

* cited by examiner

*Primary Examiner* — Chanh D Nguyen
*Assistant Examiner* — Gloryvid Figueroa-Gibson
(74) *Attorney, Agent, or Firm* — CANTOR COLBURN LLP

(57) ABSTRACT

A display device includes a display panel, a gate driver, and a driving controller. The display panel includes a pixel. The gate driver applies an anode initialization signal to the pixel. The driving controller receives a horizontal synchronization signal, receives input image data at a variable frame frequency, and controls the gate driver. A frame period for the display panel includes a scan period and one or more hold periods, the driving controller generates a count value by counting a number of pulses of the horizontal synchronization signal, and determines a current frame period as the hold period when the count value exceeds a reference value, and a time length of the anode initialization signal in each of the one or more hold periods is longer than a time length of the anode initialization signal in the scan period.

20 Claims, 26 Drawing Sheets

--Prior Art--

--Prior Art--

DISPLAY DEVICE AND METHOD OF DRIVING THE SAME

This application claims priority to Korean Patent Application No. 10-2022-0141642, filed on Oct. 28, 2022, and all the benefits accruing therefrom under 35 U.S.C. § 119, the content of which in its entirety is herein incorporated by reference.

BACKGROUND

1. Field

Embodiments of the invention relate to a display device and a method of driving the display device. More particularly, embodiments of the invention relate to a display device and a method of driving the display device that operates in a variable frequency mode.

2. Description of the Related Art

Generally, a display device displays an image at a fixed frame frequency (or constant refresh rate) such as about 60 hertz (Hz), about 120 Hz, or about 240 Hz. The frame frequency of rendering by a host processor (e.g., a Graphics Processing Unit (GPU) or graphics card) that provides input image data to the display device may not match the frame frequency of the display device. In particular, when the host processor provides the input image data for a game image for which complex rendering is performed to the display device, a mismatch of the frame frequency may intensify, and the mismatch of the frame frequency may cause a tearing phenomenon in which a boundary line in the image displayed on the display device.

To prevent such tearing phenomenon, a variable frequency mode (e.g., a Free-Sync mode, G-Sync mode) in which the host processor provides the input image data at a variable frame frequency to the display device by changing a vertical blank period for every frame period) was developed. The display device operating in the variable frequency mode may prevent the tearing phenomenon by displaying an image in synchronization with the variable frame frequency, that is, by driving a display panel with the variable frame frequency or variable driving frequency.

SUMMARY

In a display device operating in a variable frequency mode, a luminance of a display panel of the display device driven at a first driving frequency may be different from a luminance of the display panel driven at a second driving frequency. Accordingly, flicker may occur when driving frequencies of the display panel is changed.

Embodiments of the invention provide a display device displaying images with uniform luminance at different driving frequencies Embodiments of the invention provide a method for driving the display device.

In an embodiment of a display device according to the invention, a display device includes a display panel, a gate driver, and a driving controller. In such an embodiment, the display panel includes a pixel, the gate driver applies an anode initialization signal to the pixel, and the driving controller receives a horizontal synchronization signal, receives input image data at a variable frame frequency, and controls the gate driver. In such an embodiment, a frame period for the display panel includes a scan period and one or more hold periods, the driving controller generates a count value by counting a number of pulses of the horizontal synchronization signal, and determines a current frame period as the hold period when the count value exceeds a reference value, and a time length of the anode initialization signal in each of the one or more hold periods is longer than a time length of the anode initialization signal in the scan period.

In an embodiment, the driving controller may determine the frame period for the display panel based on the variable frame frequency in a way such that a time length of the frame period is N times of a time length of a minimum frame period, where N is a positive number greater than 1, and the frame period may include one scan period having a time length substantially the same as the time length of the minimum frame period and N−1 hold periods, each having a time length substantially the same as the time length of the minimum frame period.

In an embodiment, when the count value is less than or equal to the reference value, the driving controller may determine the current frame period as the scan period.

In an embodiment, in the scan period and the one or more hold periods, the driving controller may count the number of the pulses of the horizontal synchronization signal.

In an embodiment, when a scan start signal having an activation pulse at a beginning of the scan period is activated, the driving controller may reset the count value.

In an embodiment, the scan period may include an active period and a vertical blank period, and each of the one or more hold period may include the vertical blank period. In such an embodiment, the driving controller may not count the horizontal synchronization signal in the active period, and the driving controller may count the horizontal synchronization signal in the vertical blank period to generate the count value, and the driving controller may determine the current frame period as the hold period when the count value exceeds the reference value.

In an embodiment, when a vertical blank start signal having an activation pulse at a beginning of the vertical blank period is activated, the driving controller may start to count the horizontal synchronization signal.

In an embodiment, when a scan start signal having an activation pulse at a beginning of the scan period is activated, the driving controller may reset the count value.

In an embodiment, until a vertical blank start signal is activated after a scan start signal is activated, the driving controller may not count the horizontal synchronization signal.

In an embodiment, the gate driver may apply the anode initialization signal to the pixel in response to clock signals, the clock signals may include first to fourth clock signals, and the gate driver may include a shift register including stages which sequentially apply the anode initialization signals to odd-numbered pixel rows in response to the first and second clock signals, and sequentially apply the anode initialization signals to even-numbered pixel rows in response to the third and fourth clock signals.

In an embodiment, the time length of the anode initialization signal in the one or more hold periods may be gradually increased every hold period.

In an embodiment, the gate driver may apply the anode initialization signal to the pixel in response to clock signals, and start points of pulses of the anode initialization signal in the hold period may be adjusted by adjusting start points of pulses of the clock signals in one hold period, or end points of the pulses of the anode initialization signal in the one hold period may be adjusted by adjusting end points of the pulses of the clock signals in the one hold period.

In an embodiment, the gate driver may apply the anode initialization signal to the pixel in response to clock signals, and start points of pulses of the anode initialization signal in the scan period may be adjusted by adjusting start points of pulses of the clock signals in the scan period, or end points of the pulses of the anode initialization signal in the scan period may be adjusted by adjusting end points of the pulses of the clock signals in the scan period.

In an embodiment, the anode initialization signal in the one or more hold periods may be output in response to clock signals in the hold periods, and the clock signals may have a time length of P horizontal periods, where P is a positive number greater than 1.

In an embodiment, the anode initialization signal in the one or more hold periods may be output in response to clock signals in the hold periods, and the clock signals may have a time length of a Q horizontal period, where Q is a positive number 1 or less.

In an embodiment, the pixel may include a first capacitor connected between a line of a first power supply voltage and a first node, a second capacitor connected between the first node and a second node, a first transistor including a gate electrode connected to the second node, a second transistor which applies a data voltage to the first node in response to a write signal, a third transistor which diode-connects the first transistor in response to a compensation signal, a fourth transistor which applies a gate initialization voltage to the second node in response to a gate initialization signal, a fifth transistor which applies a reference voltage to the first node in response to the compensation signal, a sixth transistor which connects the first transistor to a light emitting element in response to a light emission signal, a seventh transistor which applies an anode initialization voltage to an anode electrode of the light emitting element in response to the anode initialization signal, and the light emitting element including the anode electrode and a cathode electrode connected to a line of a second power supply voltage.

In an embodiment, the scan period may include a gate initialization period in which the pixel performs a gate initialization operation, a threshold voltage compensation period in which the pixel performs a threshold voltage compensation operation, a data write period in which the pixel performs a data write operation, an anode initialization period in which the pixel performs an anode initialization operation, and a light emission period in which the pixel performs a light emission operation, and each of the one or more hold periods may include the anode initialization period in which the pixel performs the anode initialization operation, and the light emission period in which the pixel performs the light emission operation.

In an embodiment of a method of driving a display device according to the invention, the method includes determining whether a display device is in a variable frequency mode, counting a number of pulses of a horizontal synchronization signal to generate a count value when the display device is in the variable frequency mode, and determining a current frame period as a hold period when the count value exceeds a reference value, and setting a time length of an anode initialization signal in the hold period to be longer than a time length of the anode initialization signal in a scan period in response to clock signals when the current frame period is the hold period.

In an embodiment, when a scan start signal having an activation pulse at a beginning of the scan period is activated, the count value may be reset.

In an embodiment, the clock signals may include first to fourth clock signals, the anode initialization signal may be sequentially applied to odd-numbered pixel rows in response to the first and second clock signals, and the anode initialization signal may be sequentially applied to even-numbered pixel rows in response to the third and fourth clock signals.

A display device and a method of driving the display device according to embodiments of the invention may generate a count value by counting a number of pulses of a horizontal synchronization signal, determine a current frame period as a hold period when the count value exceeds a reference value. In such embodiments, a time length of an anode initialization signal in the hold period may be longer than a time length of an anode initialization signal in a scan period. Accordingly, an increase in luminance in the hold period may be effectively prevented or substantially reduced, and a difference in the luminance at different driving frequencies may be effectively prevented or substantially reduced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
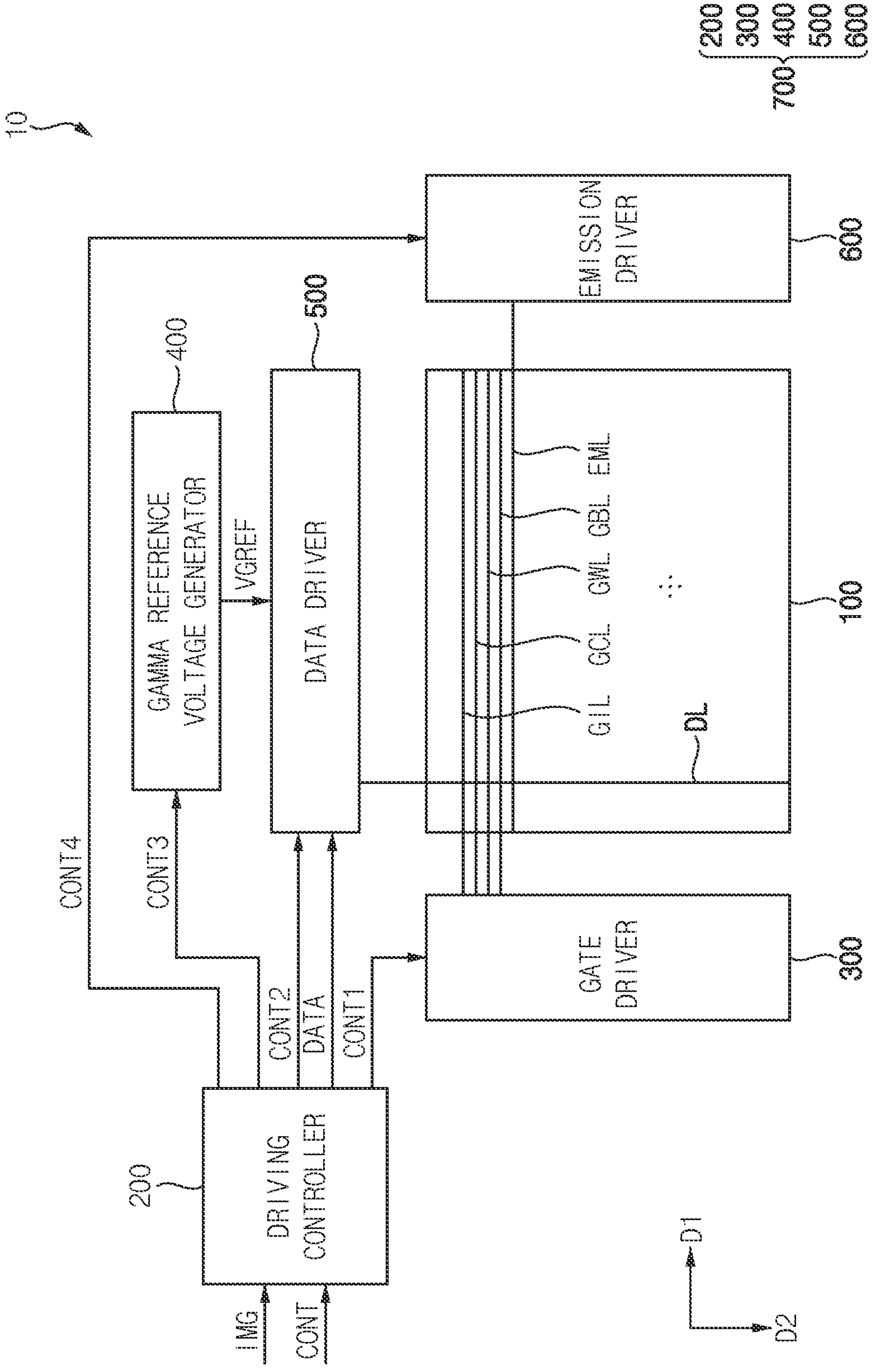
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present invention will be described in detail with reference to the accompanying drawings.

FIG. 1 is a block diagram illustrating a display device according to embodiments.

Referring to FIG. 1, an embodiment of the display device 10 may include a display panel 100 and a display panel driver 700. The display panel driver 700 may include a driving controller 200, a gate driver 300, a gamma reference voltage generator 400, a data driver 500, and an emission driver 600.

In an embodiment, for example, the driving controller 200 and the data driver 500 may be integrally formed as a single driver or chip. In an embodiment, for example, the driving controller 200, the gamma reference voltage generator 400, the data driver 500, and the emission driver 600 may be integrally formed as a single driver or chip. A driving module including at least the driving controller 200 and the data driver 500 which are integrally formed may be referred to as a timing controller embedded data driver (TED).

The display panel 100 may include a display region in which an image is displayed and a peripheral region disposed adjacent to the display region.

In an embodiment, for example, the display panel 100 may be an organic light emitting diode display panel including organic light emitting diodes. In an embodiment, for example, the display panel 100 may be a quantum-dot organic light emitting diode display panel including organic light emitting diodes and quantum-dot color filters. In an embodiment, for example, the display panel 100 may be a quantum-dot nano light emitting diode display panel including nano light emitting diodes and quantum-dot color filters.

The display panel 100 includes gate lines GIL, GCL, GWL, and GBL, data lines DL, emission lines EML, and pixels electrically connected to the gate lines GIL, GCL, GWL, and GBL, the data lines DL, and the emission lines EML. The gate lines GIL, GCL, GWL, and GBL may extend in a first direction D1. The data lines DL may extend in a second direction D2 crossing the first direction D1. The emission lines EML may extend in the first direction D1.

The driving controller 200 may receive input image data IMG and an input control signal CONT from an external host processor (e.g., a Graphics Processing Unit (GPU), an application processor, or a graphics card). In an embodiment, for example, the input image data IMG may include red image data, green image data, and blue image data. The input image data IMG may include white image data. Alternatively, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generates the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the third control signal CONT4 to the emission driver 600.

The gate driver 300 may generate gate signals driving the gate lines GIL, GCL, GWL, and GBL in response to the first control signal CONT1 received from the driving controller 200. The gate driver 300 may output the gate signals to the gate lines GIL, GCL, GWL, and GBL. In an embodiment, for example, the gate driver 300 may sequentially output the gate signals to the gate lines GIL, GCL, GWL, and GBL.

In an embodiment, the gate driver 300 may be integrated (or integrally formed) on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into the data voltage in analog form using the gamma reference voltage VGREF. The data driver 500 may output the data voltage to the data line DL.

The emission driver may generate emission signals for driving the emission lines EML in response to the fourth control signal CONT4 received from the driving controller 200. The emission driver 600 may output the emission signals to the emission lines EML.

Figure 2:
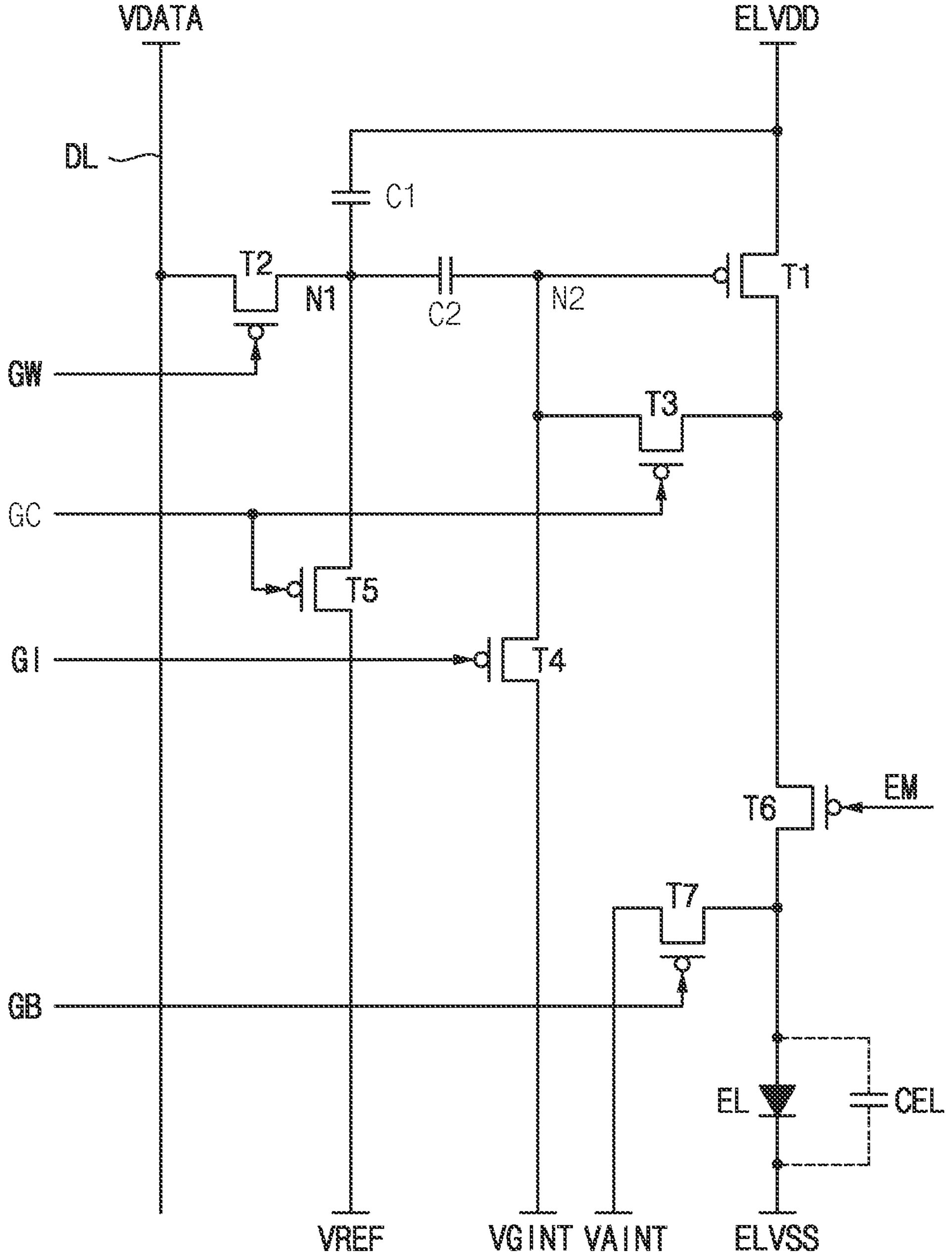
FIG. 2 is a circuit diagram illustrating an embodiment of a pixel of FIG. 1.

FIG. 2 is a circuit diagram illustrating an embodiment of a pixel of FIG. 1.

Referring to FIGS. 1 and 2, an embodiment of the pixel may include a first capacitor C1, a second capacitor C2, a first transistor T1, a second transistor T2, a third transistor T3, a fourth transistor T4, a fifth transistor T5, a sixth transistor T6, a seventh transistor T7, and a light emitting element EL.

The first capacitor C1 may be connected between a line of a first power supply voltage ELVDD (e.g., high power supply voltage) and a first node N1. In an embodiment, the first capacitor C1 may include a first electrode connected to the line of the first power supply voltage ELVDD, and a second electrode connected to the first node N1.

The second capacitor C2 may be connected between the first node N1 and a second node N2. In an embodiment, the second capacitor C2 may include a first electrode connected to the first node N1, and a second electrode connected to the second node N2.

The first transistor T1 may generate a driving current based on a voltage of the second node N2, that is, a voltage of the second electrode of the second capacitor C2. In an embodiment, the first transistor T1 may include a gate terminal connected to the second node N2, a first terminal connected to the line of the first power supply voltage ELVDD, and a second terminal connected to the third transistor T3 and the sixth transistor T6.

The second transistor T2 may transfer the data voltage VDATA of the data line DL to the first node N1 in response to a write signal GW In an embodiment, the second transistor T2 may include a gate terminal that receives the write signal GW, a first terminal connected to the first node N1, and a second terminal connected to the data line DL.

The third transistor T3 may diode-connect the first transistor T1 in response to a compensation signal GC. In an embodiment, the third transistor T3 may include a gate terminal that receives the compensation signal GC, a first terminal connected to the second terminal of the first transistor T1, and a second terminal connected to the second node N2.

The fourth transistor T4 may transfer a gate initialization voltage VGINT to the second node N2 in response to a gate initialization signal GI. In an embodiment, the fourth transistor T4 may include a gate terminal that receives the gate initialization signal GI, a first terminal connected to the second node N2, and a second terminal connected to a line of the gate initialization voltage VGINT.

The fifth transistor T5 may transfer a reference voltage VREF to the first node N1 in response to the compensation signal GC. In an embodiment, the fifth transistor T5 may include a gate terminal that receives the compensation signal GC, a first terminal connected to a line of the reference voltage VREF, and a second terminal connected to the first node N1.

The sixth transistor T6 may connect the first transistor T1 to the light emitting element EL in response to a light emission signal EM. When the sixth transistor T6 is turned on, the driving current generated by the first transistor T1 may be provided to the light emitting element EL. In an embodiment, the sixth transistor T6 may include a gate terminal that receives the light emission signal EM, a first terminal connected to the first transistor T1, and a second terminal connected to the light emitting element EL.

The seventh transistor T7 may perform an anode initialization operation in which an anode initialization voltage VAINT is applied to an anode electrode of the light emitting element EL in response to an anode initialization signal GB. In an embodiment, the seventh transistor T7 may be referred to as an anode initialization transistor that performs the anode initialization operation. In an embodiment, as shown in FIG. 2, the gate initialization voltage VGINT and the anode initialization voltage VAINT may be different voltages provided to the pixel through different lines. In an embodiment, the seventh transistor T7 may include a gate terminal that receives the anode initialization signal GB, a first terminal connected to the anode electrode of the light emitting element EL, and a second terminal connected to a line of the anode initialization voltage VAINT.

In an embodiment, the first to seventh transistors T1 to T7 may be implemented as P-type metal oxide semiconductor (PMOS) transistors. However, the present disclosure is not limited thereto.

The light emitting element EL may emit light based on the driving current generated by the first transistor T1 while the sixth transistor T6 is turned on. In an embodiment, for example, the light emitting element EL may be an organic light emitting diode (OLED). However, the present disclosure is not limited thereto. In an alternative embodiment, the light emitting element EL may be a nano light emitting diode (NED), a quantum dot (QD) light emitting diode, a micro light emitting diode, an inorganic light emitting diode, or any other suitable light emitting element. The light emitting element EL may have a parasitic capacitor CEL formed between the anode electrode of the light emitting element EL and a line of a second power supply voltage ELVSS. The parasitic capacitor CEL may be initialized or discharged by the anode initialization operation. In an embodiment, the light emitting element EL may include the anode electrode connected to the sixth transistor T6 and the seventh transistor T7 and a cathode electrode connected to the line of the second power supply voltage ELVSS (e.g., low power supply voltage).

Figure 3:
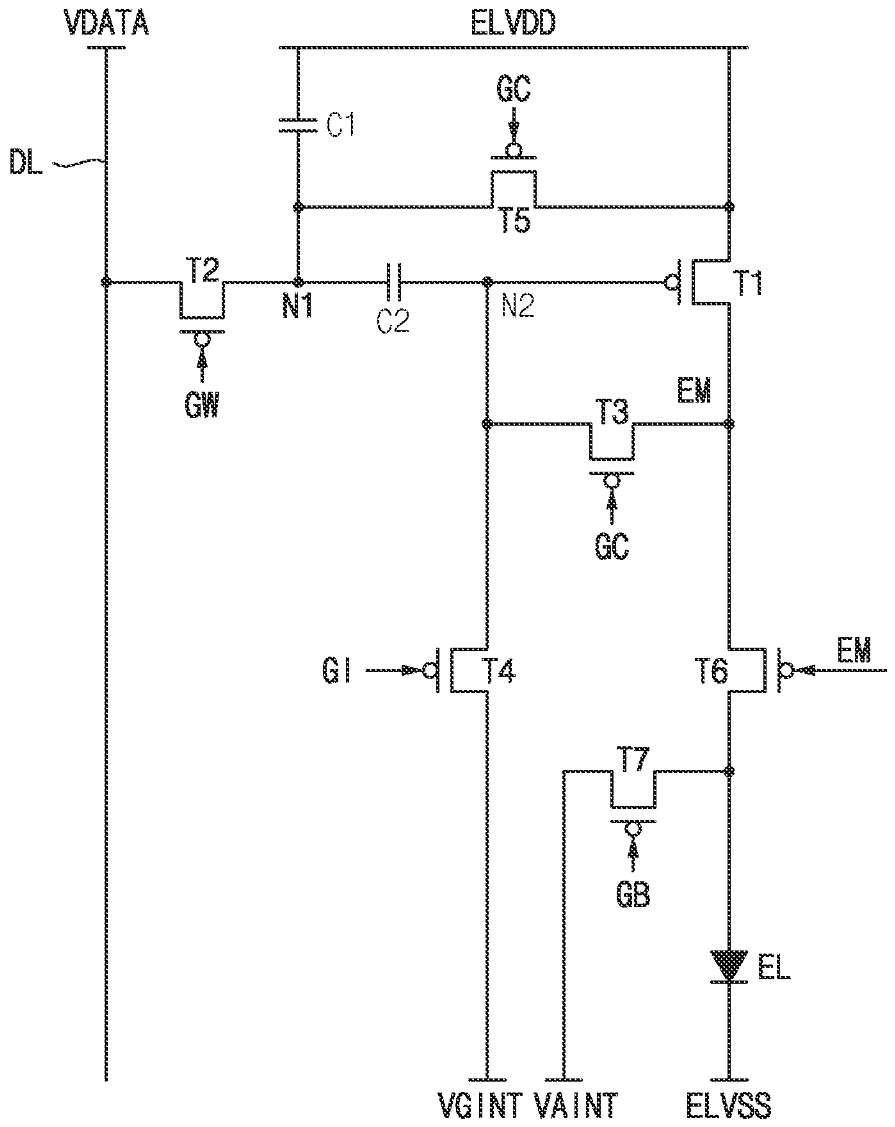
FIG. 3 is a circuit diagram illustrating an alternative embodiment of a pixel of FIG. 1.

FIG. 3 is a circuit diagram illustrating an alternative embodiment of a pixel of FIG. 1.

The pixel of FIG. 3 is substantially the same as the pixel of FIG. 2 except for the fifth transistor T5. Accordingly, any repetitive detailed description of the same or like elements as those of the pixel described with reference to FIG. 2 may be omitted.

Referring to FIGS. 1 and 3, an embodiment of the pixel of FIG. 3 may include a first capacitor C1, a second capacitor C2, a first transistor T1, a second transistor T2, a third transistor T3, a fourth transistor T4, a fifth transistor T5, a sixth transistor T6, a seventh transistor T7 and a light emitting element EL.

The fifth transistor T5 may connect a first node N1 to a first terminal of the first transistor T1 in response to a compensation signal GC. In an embodiment, the fifth transistor T5 may include a gate terminal that receives the compensation signal GC, a first terminal connected to the first node N1, and a second terminal connected to the first terminal of the first transistor T1.

In an embodiment, the first to seventh transistors T1 to T7 may be implemented as P-type metal oxide semiconductor (PMOS) transistors. However, the present disclosure is not limited thereto.

Figure 4:
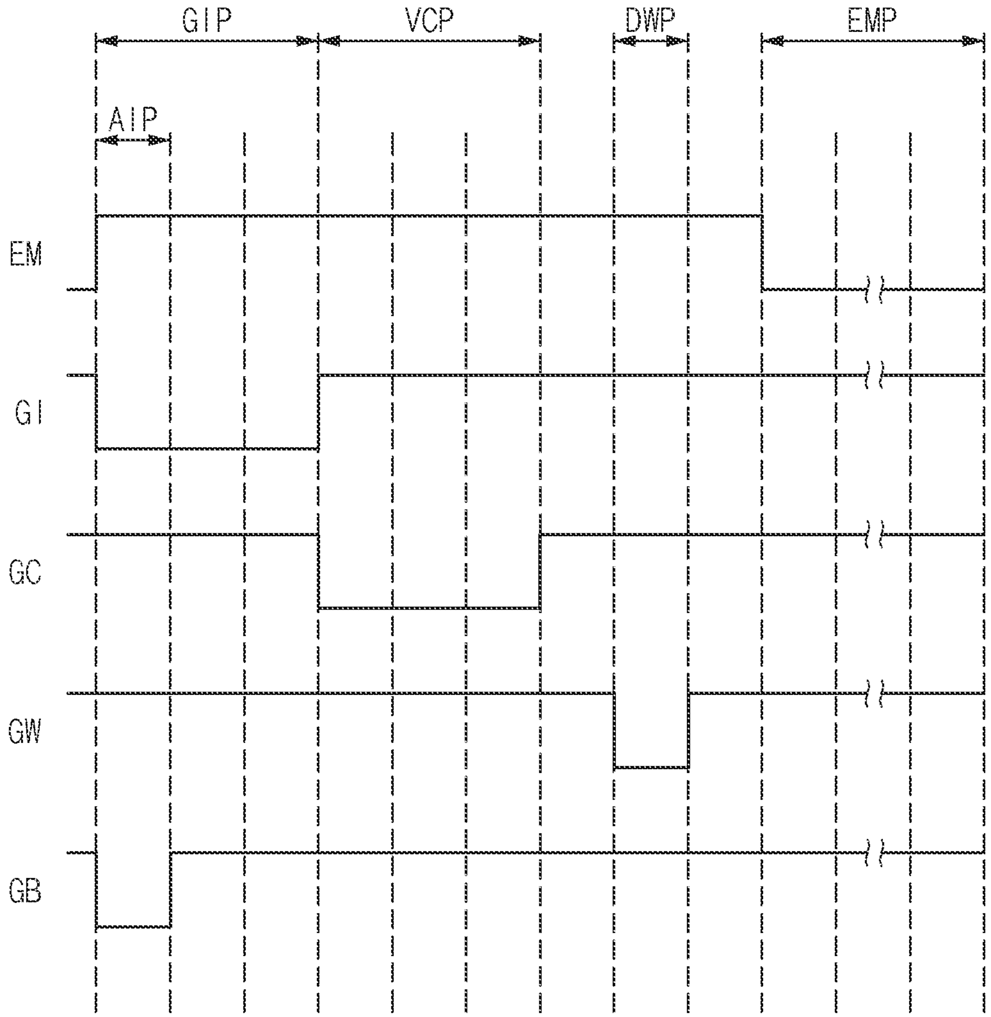
FIG. 4 is a signal timing diagram illustrating an example of an operation of the pixel of FIG. 2 in a normal mode.

FIG. 4 is a signal timing diagram illustrating an example of an operation of the pixel of FIG. 2 in a normal mode.

An embodiment of the display device 10 may be operated in a normal mode in which the display panel 100 is driven at a fixed driving frequency (e.g., about 240 Hz).

Referring to FIG. 4, the display device 10 may include a gate initialization period GIP in which the pixel performs a gate initialization operation, a threshold voltage compensation period VCP in which the pixel performs a threshold voltage compensation operation, a data write period DWP in which the pixel performs a data write operation, an anode initialization period AIP in which the pixel performs an anode initialization operation, and a light emission period EMP in which the pixel performs a light emission operation. The gate initialization period GIP, the threshold voltage compensation period VCP, the data write period DWP, and the anode initialization period AIP may be located or defined in a non-light emission period in which the light emission signal EM has an inactive level (e.g., high level). In an embodiment, the anode initialization period AIP may overlap the gate initialization period GIP.

In the gate initialization period GIP, the gate initialization signal GI may have an active level (e.g., low level), and the fourth transistor T4 may be turned on in response to the gate initialization signal GI having the active level. Accordingly, the fourth transistor T4 may perform the gate initialization operation of applying the gate initialization voltage VGINT to the second node N2, that is, the gate terminal of the first transistor T1, thereby initializing the gate terminal of the first transistor T1.

In the threshold voltage compensation period VCP, the compensation signal GC may have an active level, and the third transistor T3 and the fifth transistor T5 may be turned on in response to the compensation signal GC having the active level. Accordingly, the fifth transistor T5 may apply the reference voltage VREF to the first node N1, that is, the first electrode of the second capacitor C2. In an embodiment, the reference voltage VREF may have the same voltage level as the first power supply voltage ELVDD. However, the present disclosure is not limited thereto. In addition, the third transistor T3 may diode-connect the first transistor T1. Accordingly, a voltage obtained by subtracting a threshold voltage of the first transistor T1 from the first power supply voltage ELVDD may be applied to the second node N2, that is, the second electrode of the second capacitor C2 through the diode-connected first transistor T1. Accordingly, the threshold voltage compensation operation may be performed in the threshold voltage compensation period VCP. In addition, in an embodiment, the threshold voltage compensation period VCP and the data write period DWP may be separated and the threshold voltage compensation period VCP may have a time length longer than the data write period DWP. In such an embodiment where the threshold voltage compensation period VCP has a time length longer than the data write period DWP, the threshold voltage of the first transistor T1 may be sufficiently compensated.

In the data write period DWP, the write signal GW may have an active level, and the second transistor T2 may be turned on in response to the write signal GW having the active level. Accordingly, the second transistor T2 may apply the data voltage VDATA to the first node N1, that is, the first electrode of the second capacitor C2. Accordingly, the first electrode of the second capacitor C2 may be varied, from the reference voltage VREF to the data voltage VDATA, by a difference between the data voltage VDATA and the reference voltage VREF (e.g., "VDATA-VREF"). When the first electrode of the second capacitor C2 is varied by the difference between the data voltage VDATA and the reference voltage VREF, the second electrode of the second capacitor C2 in a floating state may also be varied by the difference between the data voltage VDATA and the reference voltage VREF. Accordingly, in the data write period DWP, the voltage of the second electrode of the second capacitor C2, that is, the voltage of the second node N2 may be a voltage obtained by subtracting the threshold voltage VTH from the first power supply voltage ELVDD and adding the difference between the data voltage VDATA and the reference voltage VREF (e.g., "ELVDD−VTH+VDATA−VREF").

In the anode initialization period AIP, the anode initialization signal GB may have an active level, and the seventh transistor T7 may be turned on in response to the anode initialization signal GB having the active level. Accordingly, the seventh transistor T7 may apply the anode initialization voltage VAINT to the anode electrode of the light emitting element EL, and accordingly, the parasitic capacitor CEL of the light emitting element EL may be initialized or discharged.

In the light emission period EMP, the light emission signal EM may have an active level, and the sixth transistor T6 may be turned on in response to the light emission signal EM having the active level. Accordingly, the first transistor T1 may generate the driving current based on the voltage of the second node N2, that is, the voltage of the second electrode of the second capacitor C2, the sixth transistor T6 may provide the driving current generated by the first transistor T1 to the light emitting element EL, and the light emitting element EL may emit light based on the driving current.

Figure 5:
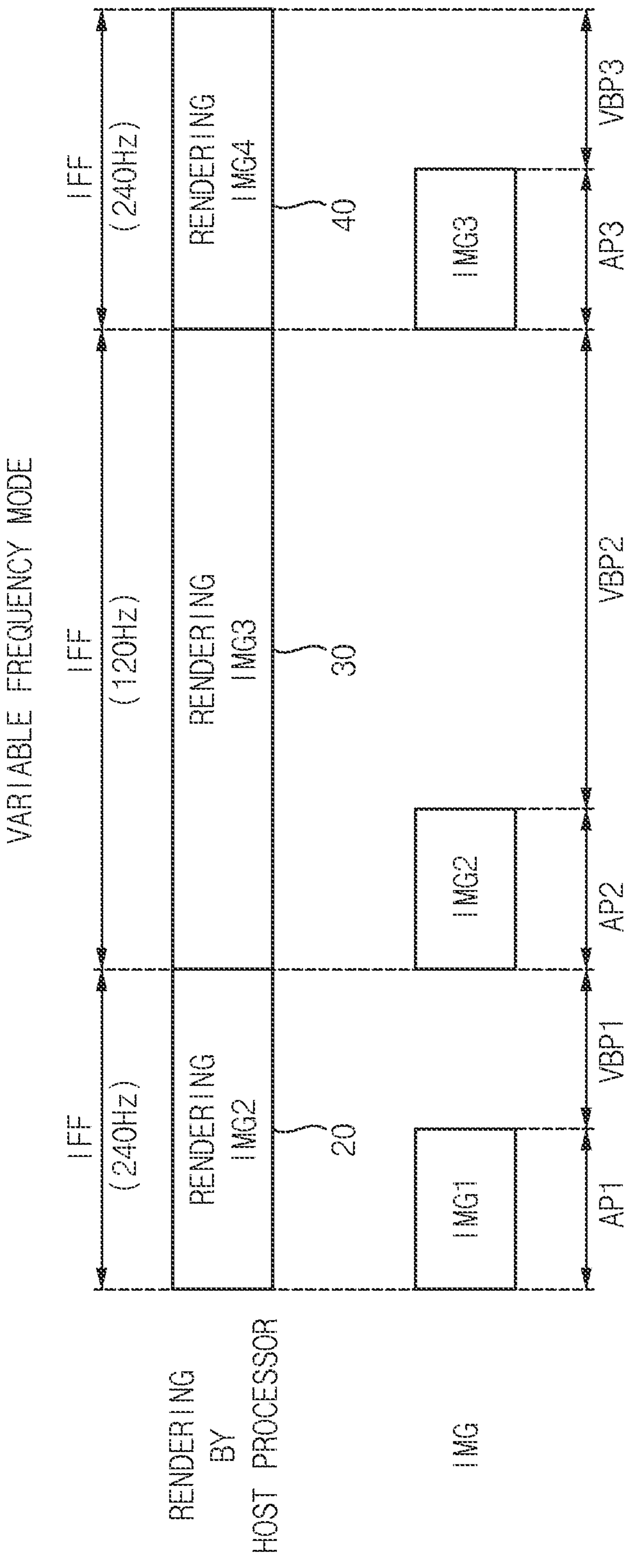
FIG. 5 is a diagram illustrating an example of an operation of the display device of FIG. 1 in a variable frequency mode.
Figure 6:
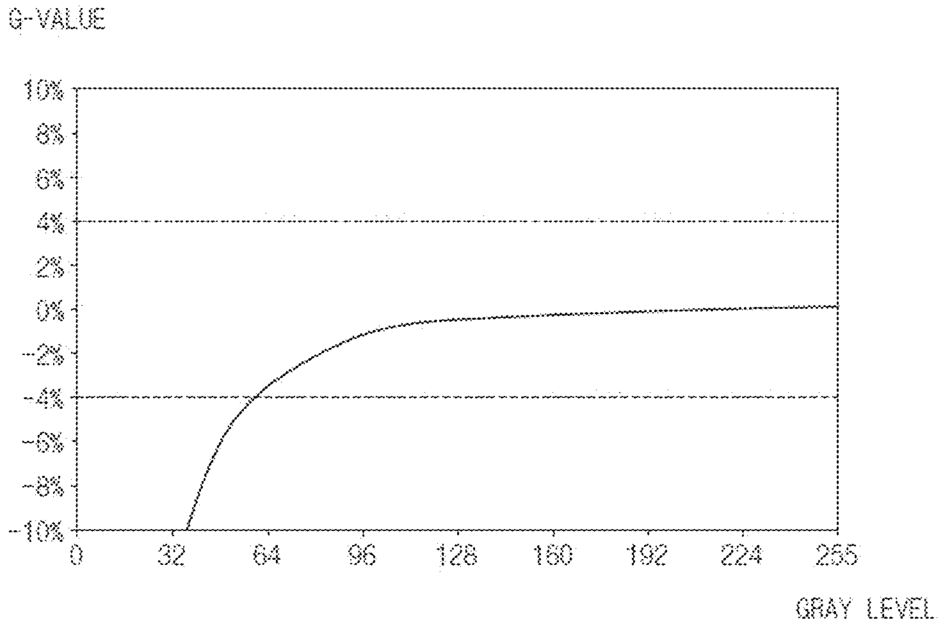
FIG. 6 is a diagram illustrating an example of a G-value of a conventional display device.
Figure 7:
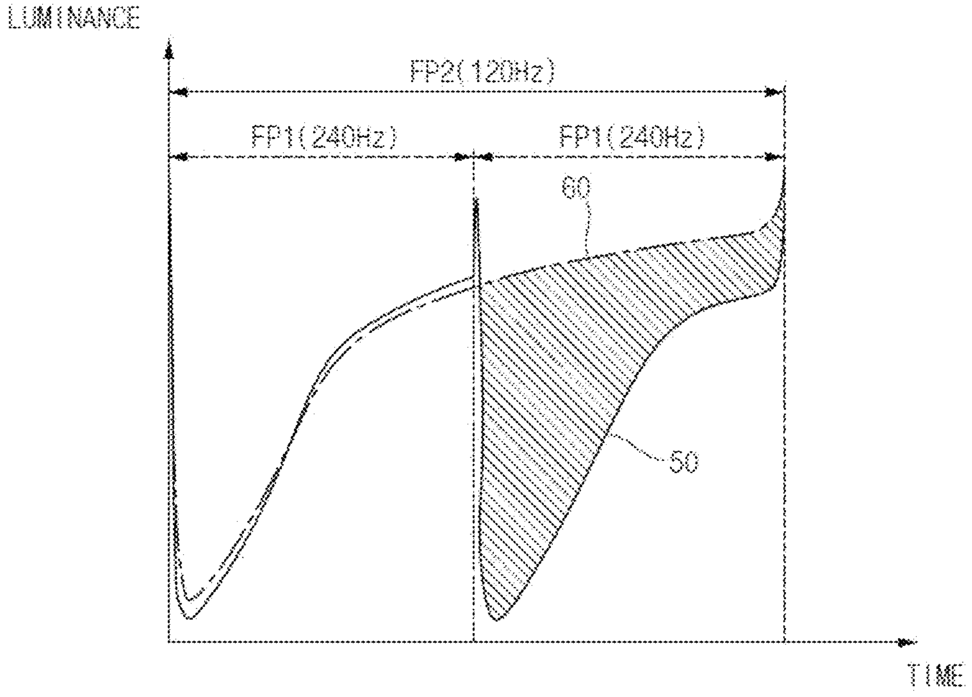
FIG. 7 is a diagram illustrating an example of luminance of a display panel driven at driving frequencies of about 240 Hz and about 120 Hz in the conventional display device.

FIG. 5 is a diagram illustrating an example of an operation of the display device of FIG. 1 in a variable frequency mode. FIG. 6 is a diagram illustrating an example of a G-value of a conventional display device. FIG. 7 is a diagram illustrating an example of luminance of a display panel driven at driving frequencies of about 240 Hz and about 120 Hz in the conventional display device.

Referring to FIG. 5, the display device 10 may not only be operated in the normal mode in which the display panel 100 is driven at the fixed driving frequency (e.g., about 240 Hz), but also may be operated in the variable frequency mode in which the display panel 100 is driven at a variable driving frequency. In the normal mode, the host processor may provide input image data IMG at a fixed input frame frequency IFF to a driving controller 200, and the driving frequency of the display panel 100 may be determined at the fixed input frame frequency IFF. Accordingly, in the normal mode, the driving controller 200 may control the data driver 500 and the gate driver 300 to drive the display panel 100 with the fixed input frame frequency IFF, that is, the fixed driving frequency.

In the variable frequency mode, the host processor may provide the input image data IMG at a variable frame frequency IFF (or variable frame rate) to the driving controller 200 by changing a time length of a vertical blank period at every frame and the driving frequency of the display panel 100 may also be dynamically changed based on the variable frame frequency IFF. Accordingly, in the variable frequency mode, the driving controller 200 may control the data driver 500 and the gate driver 300 to drive the display panel 100 at the variable driving frequency corresponding to the variable frame frequency IFF. In an embodiment, for example, the variable frame frequency IFF or the variable frame rate may range from about 1 Hz to about 240 Hz. However, the present disclosure is not limited thereto. In an embodiment, for example, the variable frequency mode may be a Free-Sync mode or a G-Sync mode. However, the present disclosure is not limited thereto.

For example, as shown in FIG. 5, cycle or frequency of the rendering 20, 30, 40 of the host processor (e.g., GPU, application processor, or graphics card) may not be constant, and the host processor may provide the input image data IMG, that is, the input image data IMG1, IMG2, and IMG3 to the display device 10 in the variable frequency mode by synchronizing with non-constant cycle or frequency of the rendering 20, 30 and 40. In FIG. 5, the host processor may output the first input image data IMG1 in a first active period AP1, and continue a first vertical blank period VBP1 until the rendering 20 for the second input image data IMG2 is completed. Accordingly, when the second input image data IMG2 is rendered 20 at a frequency of about 240 Hz, the host processor may provide the first input image data IMG1 to the display device 10 at an input frame frequency IFF of about 240 Hz. In addition, the host processor may output second input image data IMG2 in a second active period AP2, and continue a second vertical blank period VBP2 until the rendering 30 for the third input image data IMG3 is completed. Accordingly, when the third input image data IMG3 is rendered 30 at a frequency of about 120 Hz, the host processor may provide the second input image data IMG2 to the display device 10 at an input frame frequency IFF of about 120 Hz. In addition, the host processor may output third input image data IMG3 in a third active period AP3, and continue a third vertical blank period VBP3 until the rendering 40 for the fourth input image data IMG4 is completed. Accordingly, when the fourth input image data IMG4 is rendered 40 at a frequency of about 240 Hz, the host processor may provide the third input image data IMG3 to the display device 10 at an input frame frequency IFF of about 240 Hz.

In the variable frequency mode, the display device 10 may display an image in synchronization with the variable frame frequency IFF, so that a tearing phenomenon caused by frame frequency mismatch may be effectively prevented. However, a conventional display device operated in a variable frequency mode may have a luminance difference at different driving frequencies.

Referring to FIG. 6, G-value is determined by an equation "G-VALUE=(LUM(MAXFREQ)−LUM(MAXFREQ/2))/LUM(MAXFREQ)", where G-VALUE represents the G-value, LUM(MAXFREQ) represents a luminance of the display panel 100 driven at a maximum frequency of the variable frame frequency (e.g., about 120 Hz or about 240 Hz), and LUM(MAXFREQ/2) represents a luminance of the display panel 100 driven at half of the maximum frequency (e.g., about 60 Hz or about 120 Hz). In FIG. 6, the G-value of the conventional display device may have an absolute value of about 4% or less in more than 60-grayscale, but have an absolute value excessing about 4% or more in 60-grayscale or less. In other words, in the variable frequency mode, when a low-grayscale image (e.g., 60-grayscale or less) is displayed, a display panel of the conventional display device may have a large luminance difference at different driving frequencies (or different frame frequencies), and flicker may occur when the driving frequency (or frame frequency) of the display panel 100 is changed.

As shown in FIG. 7, the luminance difference between the different driving frequencies may occur because light waveforms 50 and 60 of the display panel 100 have different numbers of luminance valleys at the different driving frequencies (particularly, when a low grayscale image is displayed). In other words, in FIG. 6, for the same amount of time or a same time duration, the display panel 100 driven at about 240 Hz may have two frame periods FP1, and the display panel 100 driven at about 120 Hz may have one frame period FP2. In addition, in the conventional display device, each pixel may perform the anode initialization operation only once in every frame period FP1 and FP2, and the light waveforms 50 and 60 of the display panel 100 may have one luminance valley due to the anode initialization operation in every frame period FP1 and FP2 (that is, because the driving current generated by the driving transistor is consumed to charge the parasitic capacitor of the light emitting element discharged by the anode initialization operation). Accordingly, for the same amount of time, the display panel 100 driven at about 240 Hz may have two luminance valleys, and the display panel 100 driven at about 120 Hz may have one luminance valley, so that the luminance of the display panel 100 driven at about 120 Hz may be higher than the luminance of the display panel 100 driven at about 240 Hz (particularly, when the low grayscale image is displayed).

In an embodiment of the display device 10, each pixel may perform the anode initialization operation at a constant cycle (e.g., at a maximum frequency of the variable frame frequency IFF) regardless of the driving frequency to reduce the luminance difference between the different driving frequencies.

In an embodiment, to periodically perform the anode initialization operation regardless of the driving frequency, the driving controller 200 may determine a frame period for the display panel 100 according to the variable frame frequency IFF so that a time length of the frame period is N times a time length of a minimum frame period (N is a positive integer of 1 or greater). The driving controller 200 may divide the frame period into a scan period SP having a time length corresponding to the time length of the minimum frame period and N−1 hold periods HP, each having the time length corresponding to the time length of the minimum frame period.

The minimum frame period may be a frame period corresponding to the maximum frequency of the variable frame frequency IFF or a maximum driving frequency of the display panel 100.

Figure 8:
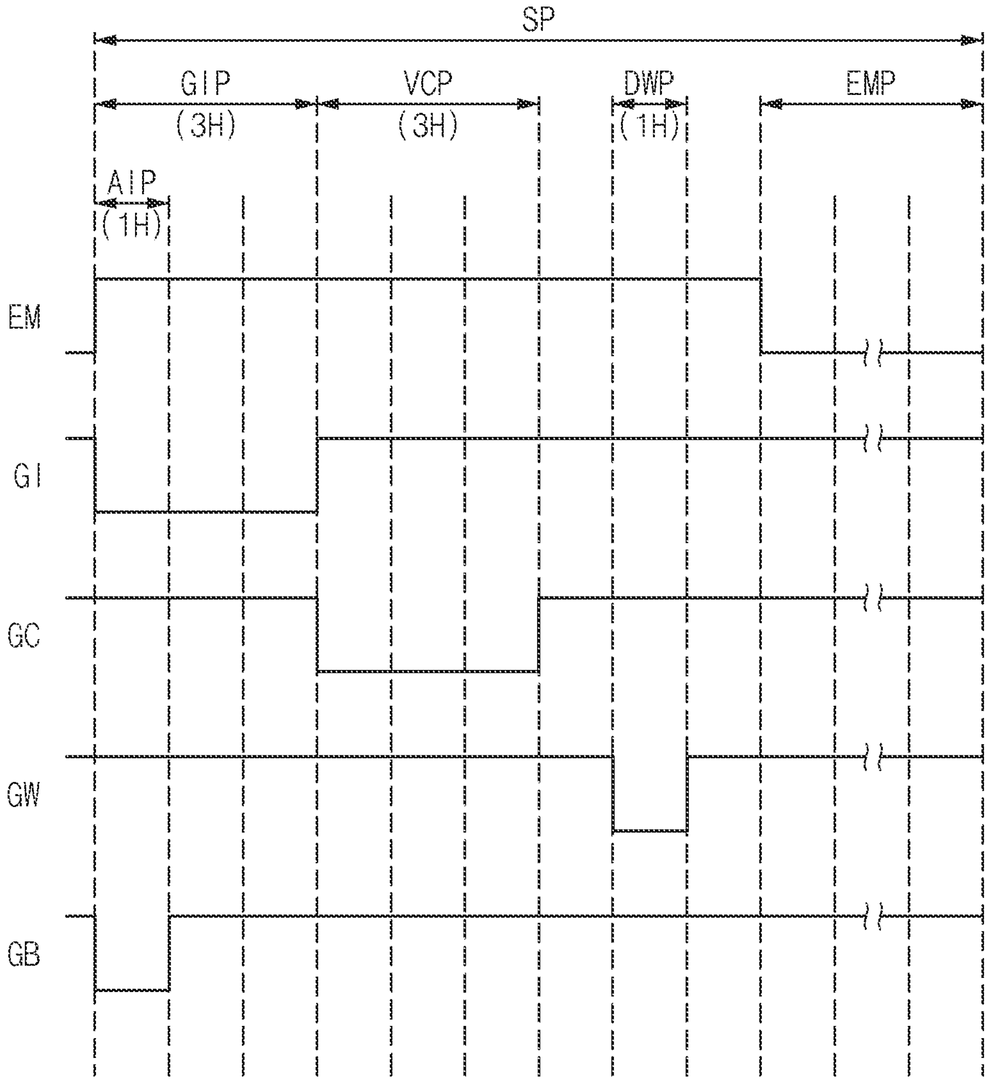
FIG. 8 is a signal timing diagram illustrating an example of an operation of a pixel of FIG. 2 in a scan period.
Figure 9:
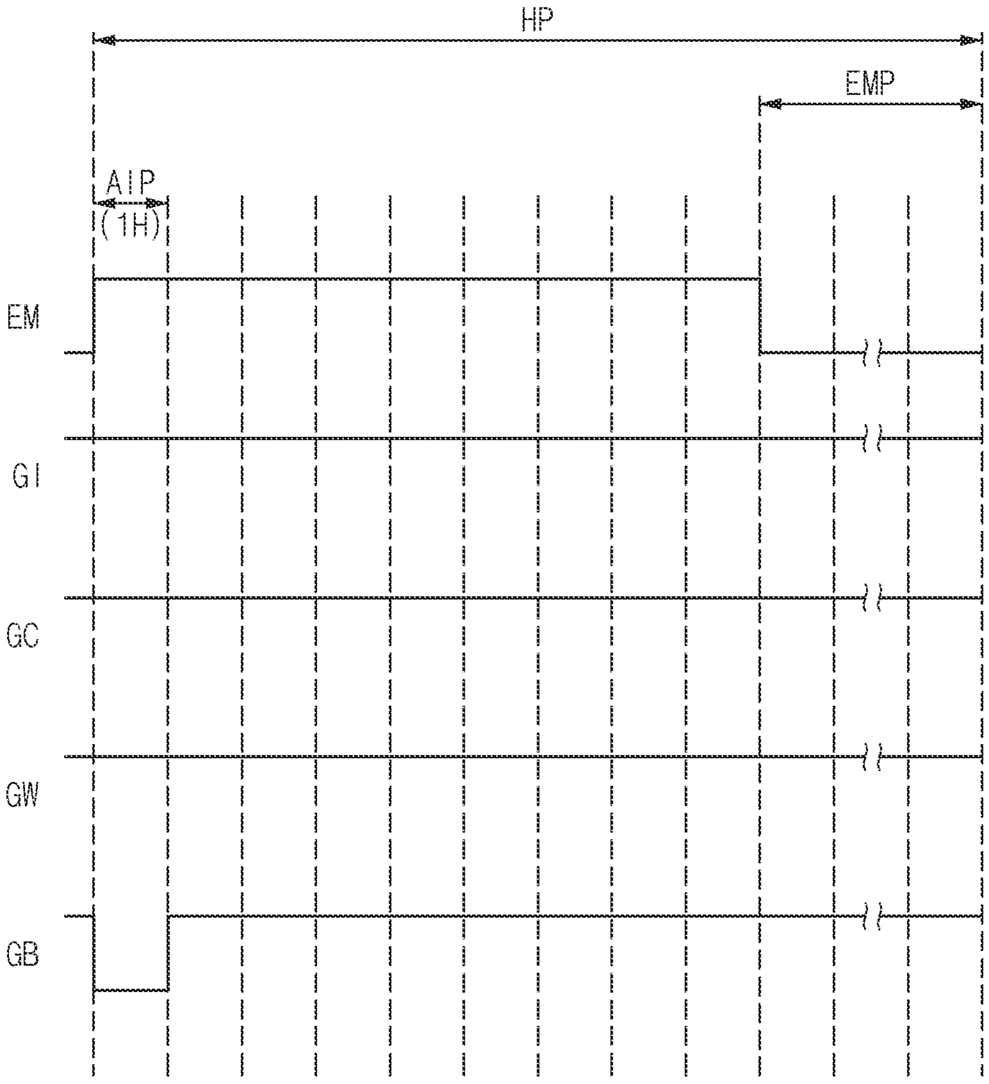
FIG. 9 is a signal timing diagram illustrating an example of an operation of the pixel of FIG. 2 in a hold period.
Figure 10:
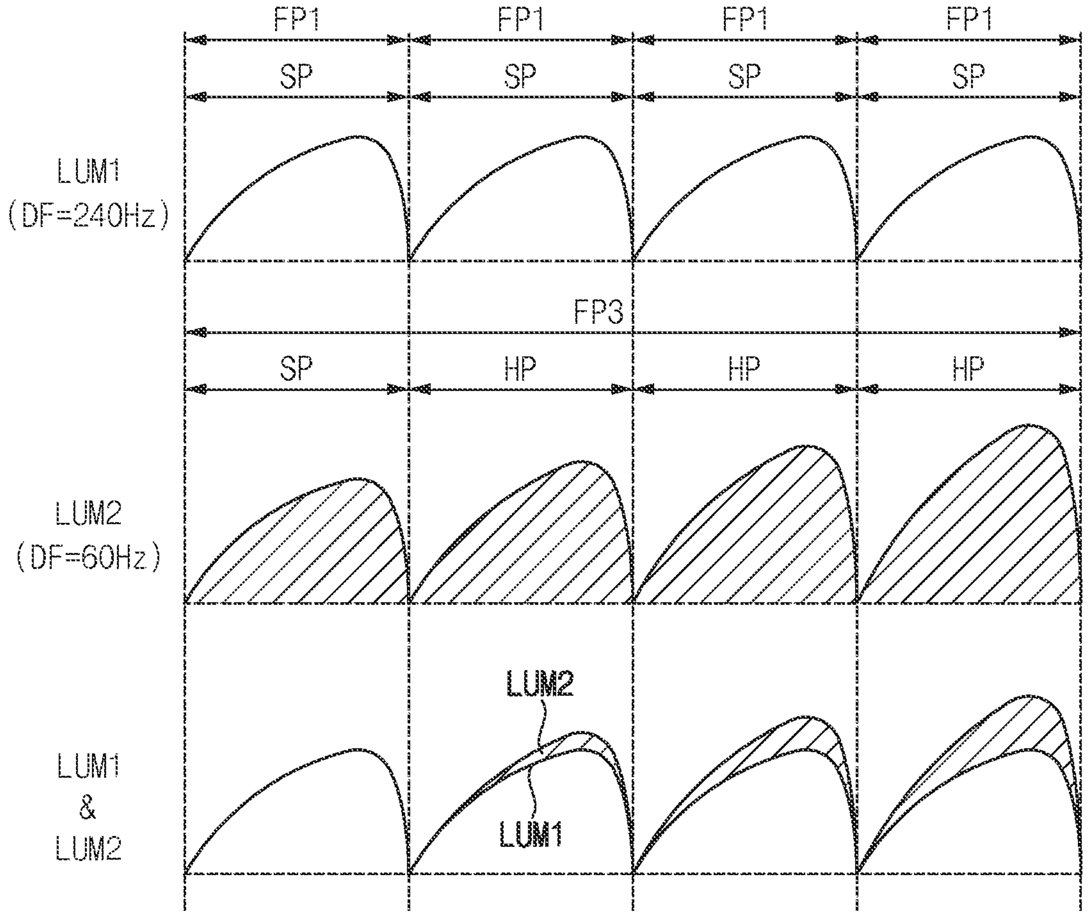
FIG. 10 is a diagram illustrating an example of luminance of a display panel driven at driving frequencies of about 240 Hz and about 60 Hz in the display device of FIG. 9.

FIG. 8 is a signal timing diagram illustrating an example of an operation of a pixel of FIG. 2 in the scan period. FIG. 9 is a signal timing diagram illustrating an example of an operation of the pixel of FIG. 2 in the hold period. FIG. 10 is a diagram illustrating an example of luminance of a display panel driven at driving frequencies of about 240 Hz and about 60 Hz in the display device of FIG. 9.

In an embodiment, the frame period for the pixel (or the display panel 100 including the pixel) may include one scan period and/or one or more hold periods. The scan period may be a period in which the data voltage VDATA is provided to the pixel, and the hold period may be a period in which the pixel maintains the data voltage VDATA.

In an embodiment, as shown in FIG. 8, the scan period SP may include a gate initialization period GIP in which the pixel performs a gate initialization operation, a threshold voltage compensation period VCP in which the pixel performs a threshold voltage compensation operation, a data write period DWP in which the pixel performs a data write operation, an anode initialization period AIP in which the pixel performs an anode initialization operation, and a light emission period EMP in which the pixel performs a light emission operation. The gate initialization period GIP, the threshold voltage compensation period VCP, the data write period DWP and the anode initialization period AIP may be located in a non-light emission period in which the light emission signal EM has an inactive level (e.g., high level). In an embodiment, the anode initialization period AIP may overlap the gate initialization period GIP.

In the gate initialization period GIP, the gate initialization signal GI may have an active level (e.g., low level), and the fourth transistor T4 may be turned on in response to the gate initialization signal GI having the active level. Accordingly, the fourth transistor T4 may perform the gate initialization operation of applying the gate initialization voltage VGINT to the second node N2, that is, the gate terminal of the first transistor T1, and accordingly, initializing the gate terminal of the first transistor T1. In an embodiment, the time length of the gate initialization period GIP may correspond to 3 horizontal periods (3H). However, the present disclosure is not limited thereto. Herein, 1 horizontal period (1H) may be a time allocated to each pixel row of the display panel 100.

In the threshold voltage compensation period VCP, the compensation signal GC may have an active level, and the third transistor T3 and the fifth transistor T5 may be turned on in response to the compensation signal GC having the active level. Accordingly, the fifth transistor T5 may apply the reference voltage VREF to the first node N1, that is, the first electrode of the second capacitor C2. In an embodiment, the reference voltage VREF may have the same voltage level as the first power supply voltage ELVDD. However, the present disclosure is not limited thereto. In addition, the third transistor T3 may diode-connect the first transistor T1. Accordingly, a voltage obtained by subtracting a threshold voltage of the first transistor T1 from the first power supply voltage ELVDD may be applied to the second node N2, that is, the second electrode of the second capacitor C2 through the diode-connected first transistor T1, such that the threshold voltage compensation operation may be performed in the threshold voltage compensation period VCP. In an embodiment, the time length of the threshold voltage compensation period VCP may correspond to 3 horizontal periods (3H). However, the present disclosure is not limited thereto. In addition, in an embodiment, the threshold voltage compensation period VCP and the data write period DWP may be separated, and the threshold voltage compensation period VCP may have a time length (e.g., 1H time) longer than the data write period DWP, for example, 3 horizontal periods (3H). When the threshold voltage compensation period VCP has a time length longer than the data write period DWP, the threshold voltage of the first transistor T1 may be sufficiently compensated.

In the data write period DWP, the write signal GW may have an active level, and the second transistor T2 may be turned on in response to the write signal GW having the active level. Accordingly, the second transistor T2 may apply the data voltage VDATA to the first node N1, that is, the first electrode of the second capacitor C2. Accordingly, the first electrode of the second capacitor C2 may be varied, from the reference voltage VREF to the data voltage VDATA, by a difference between the data voltage VDATA and the reference voltage VREF (e.g., "VDATA-VREF"). When the first electrode of the second capacitor C2 is varied by the difference between the data voltage VDATA and the reference voltage VREF, the second electrode of the second capacitor C2 in a floating state may also be varied by the difference between the data voltage VDATA and the reference voltage VREF. Accordingly, in the data write period DWP, the voltage of the second electrode of the second capacitor C2, that is, the voltage of the second node N2 may be a voltage obtained by subtracting the threshold voltage VTH from the first power supply voltage ELVDD and adding the difference between the data voltage VDATA and the reference voltage VREF (e.g., "ELVDD−VTH+VDATA−VREF"). In an embodiment, the time length of the data write period DWP may correspond to 1 horizontal period (1H). However, the present disclosure is not limited thereto.

In the anode initialization period AIP, the anode initialization signal GB may have an active level, and the seventh transistor T7 may be turned on in response to the anode initialization signal GB having the active level. Accordingly, the seventh transistor T7 may apply the anode initialization voltage VAINT to the anode electrode of the light emitting element EL such that the parasitic capacitor CEL of the light emitting element EL may be initialized or discharged. In an embodiment, the time length of the anode initialization period AIP may correspond to 1 horizontal period (1H). However, the present disclosure is not limited thereto.

In the light emission period EMP, the light emission signal EM may have an active level, and the sixth transistor T6 may be turned on in response to the light emission signal EM having the active level. Accordingly, the first transistor T1 may generate the driving current based on the voltage of the second node N2, that is, the voltage of the second electrode of the second capacitor C2, the sixth transistor T6 may provide the driving current generated by the first transistor T1 to the light emitting element EL, and the light emitting element EL may emit light based on the driving current.

In an embodiment, as shown in FIG. 9, the hold period HP may include only an anode initialization period AIP in which the pixel performs the anode initialization operation, and a light emission period EMP in which the pixel performs a light emission operation. Accordingly, in the hold period HP, the pixel may maintain the stored data voltage VDATA in the data write period DWP of the scan period SP and the parasitic capacitor CEL of the light emitting element EL may be initialized or discharged.

In the pixel, the parasitic capacitor CEL of the light emitting element EL may be discharged by the anode initialization operation in the one or more hold periods HP. In an embodiment, as the time length of the anode initialization signal GB in each of the hold periods HP is longer than the time length of the anode initialization signal GB in the scan period SP, degree of discharge of the parasitic capacitor CEL may be increased in the hold periods HP. Accordingly, an increase in luminance in the hold period HP may be effectively prevented or substantially reduced, and a luminance difference at different driving frequencies may be effectively prevented or substantially reduced.

When the anode initialization operation is performed at a constant cycle regardless of the driving frequency DF, the light waveforms of the display panel 100 driven at different driving frequencies may have the same number of luminance valleys. In an embodiment, for example, as shown in FIG. 10, a light waveform LUM1 of the display panel 100 driven at a driving frequency DF of about 240 Hz and a light waveform LUM2 of the display panel 100 driven at a driving frequency DF of about 60 Hz may have the same number of luminance valleys for the same amount of time.

However, even when the anode initialization operation is performed at a constant cycle regardless of the driving frequency DF, each pixel stores a new data voltage VDATA in the scan period SP but maintains the previous data voltage VDATA in the hold period HP, and accordingly, distortion of the data voltage VDATA due to a leakage current of each pixel may be accumulated as the hold periods HP continue. Accordingly, the luminance of the display panel 100 may be increased in the hold period HP, and the luminance of the display panel 100 driven at a relatively low driving frequency DF may be higher than the luminance of the display panel 100 driven at a relatively high driving frequency DF.

In an embodiment, to prevent or reduce the luminance increase in the hold period HP and the luminance difference at different driving frequencies DF, the driving controller 200 may determine whether a current frame period is the scan period SP or the hold periods HP. When the current frame period is the hold period HP, the gate driver 300 may, in response to clock signals, output the anode initialization signal GB in the hold periods HP, which is longer than the time length of the anode initialization signal GB in the scan period SP.

Figure 11:
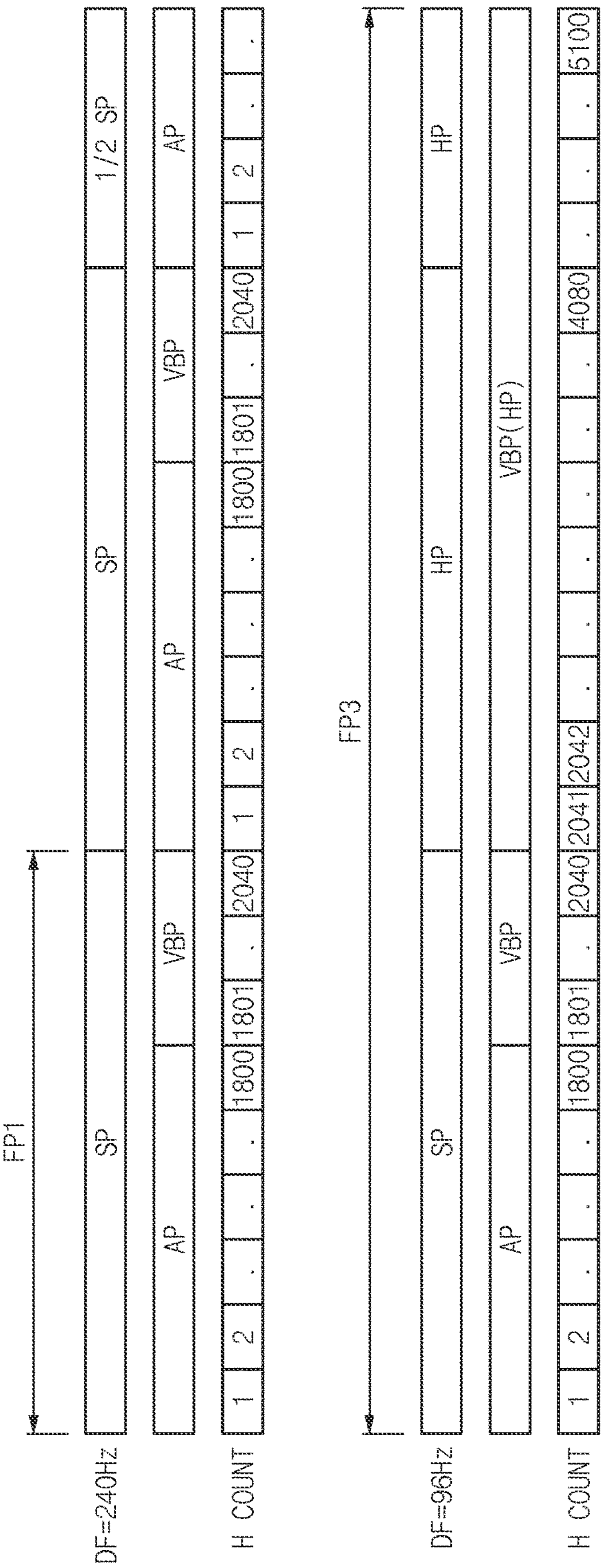
FIG. 11 is a timing diagram illustrating an example of an operation of the display device of FIG. 1 for determining a hold period in a variable frequency mode.
Figure 12:
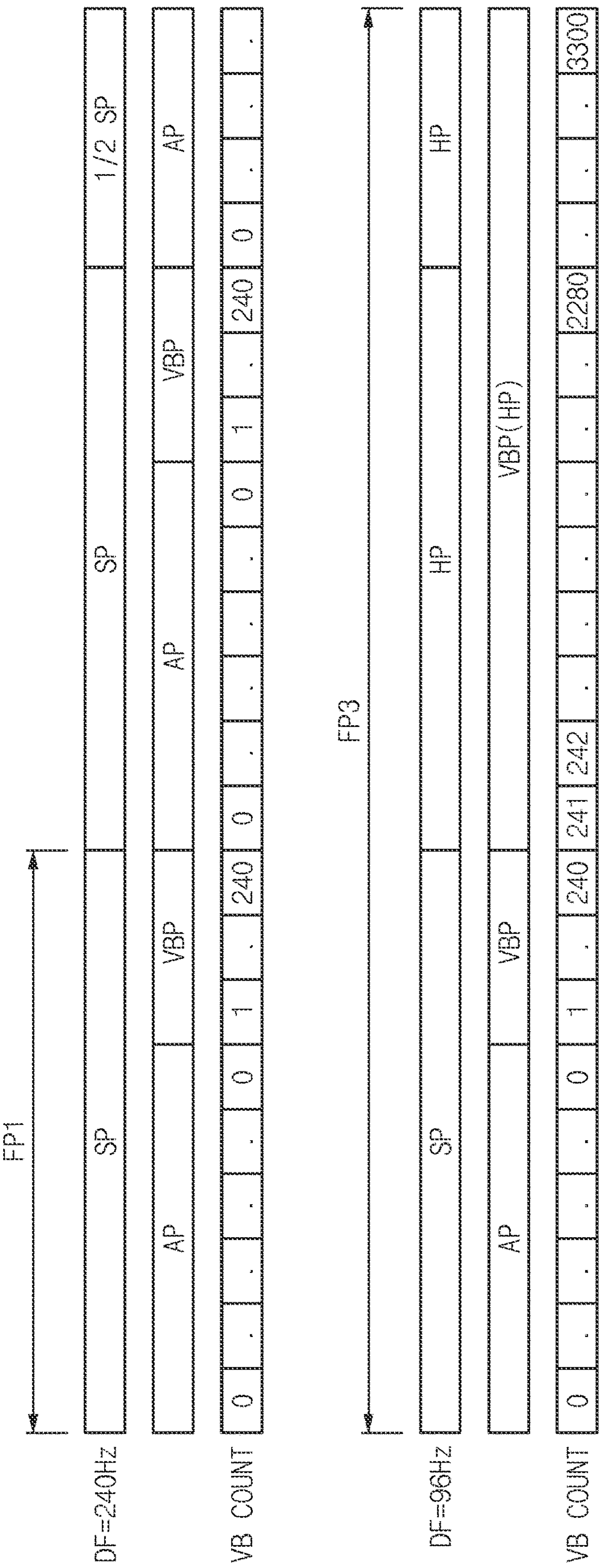
FIG. 12 is a timing diagram illustrating another example of an operation of the display device of FIG. 1 for determining a hold period in a variable frequency mode.

FIG. 11 is a timing diagram illustrating an example of an operation of the display device of FIG. 1 for determining a hold period in the variable frequency mode. FIG. 12 is a timing diagram illustrating another example of an operation of the display device of FIG. 1 for determining the hold period in the variable frequency mode.

Referring to FIG. 11, the frame period may include a scan period SP having a time length corresponding to the time length of the minimum frame period, and/or N−1 hold periods HP, each having a time length corresponding to the time length of the minimum frame period. Therefore, the number of pulses of the horizontal synchronization signal in one scan period SP and the number of pulses of the horizontal synchronization signal in one hold period HP may be the same as each other, and may have a preset value. In addition, the number of pulses of the horizontal synchronization signal in the frame period of different driving frequencies DF may have a preset value.

In an embodiment, to determine whether the current frame period is the scan period SP or the hold periods HP, the driving controller 200 may count the number of pulses of the horizontal synchronization signal in the scan period SP and the hold periods HP.

The driving controller 200 may generate a horizontal count value H COUNT by counting the number of pulses of the horizontal synchronization signal, and may determine the current frame period as the hold period HP when the horizontal count value H COUNT exceeds a reference value. Therefore, when the horizontal count value H COUNT is the reference value or less, the driving controller 200 may determine the current frame period as the scan period SP. The horizontal count value H COUNT may be a value obtained by counting the number of pulses of the horizontal synchronization signal by the driving controller 200 in the scan period SP and the hold period HP.

In an embodiment, for example, the driving controller 200 may generate a horizontal count value H COUNT by counting the number of pulses of the horizontal synchronization signal. When a scan start signal having an activation pulse at the beginning of the scan period SP is activated, the driving controller 200 may reset the horizontal count value H COUNT. When the horizontal count value H COUNT is the reference value or less, the driving controller 200 may determine the current frame period as the scan period SP. When the scan start signal is not activated, the horizontal count value H COUNT may exceed the reference value. When the horizontal count value H COUNT exceeds a reference value, the driving controller 200 may determine the current frame period as the hold period HP.

The scan start signal may have an activation pulse at the beginning of the scan period SP, and accordingly, may be a point at which the scan period SP starts. In an embodiment, for example, the scan start signal may be a vertical start signal. However, the present disclosure is not limited thereto.

In an embodiment, for example, as shown in FIG. 11, for the same amount of time, the display panel 100 driven at a driving frequency DF of about 240 Hz may have 2.5 frame periods FP1, and the display panel 100 driven at a driving frequency DF of about 96 Hz may have one frame period FP3. The number of pulses of the horizontal synchronization signal of the frame period FP1 corresponding to the driving frequency DF of about 240 Hz may be 2040, and the horizontal count value H COUNT in the last horizontal cycle of the frame period FPT may be 2040. The number of pulses of the horizontal synchronization signal of the frame period FP3 corresponding to the driving frequency DF of about 96 Hz may be 5100, and the horizontal count value H COUNT in the last horizontal cycle of the frame period FP3 may be 5100. The number of pulses of the horizontal synchronization signal in one scan period SP may be 2040, and the horizontal count value H COUNT may be 2040 at most. The number of pulses of the horizontal synchronization signal in one hold period HP may be 2040, and the horizontal count value H COUNT may exceed 2040.

At a driving frequency DF of about 240 Hz, the driving controller 200 may generate the horizontal count value H COUNT of 2040 in the last horizontal cycle of the scan period SP, and when the scan start signal is activated at the beginning of the scan period SP (a first horizontal cycle of the scan period SP), the driving controller 200 may reset the horizontal count value H COUNT. At the driving frequency DF of 240 Hz, since the horizontal count value H COUNT is 1 at least and 2040 at most, which is always the reference value of 2040 or less, the driving controller 200 may determine the current frame period as the scan period SP.

When the driving frequency DF is about 96 Hz and the previous frame period is the scan period SP, the horizontal count value H COUNT of 2040 may be generated in the last horizontal cycle of the scan period SP. At the driving frequency DF of 96 Hz, since the horizontal cycle following the last horizontal cycle of the scan period SP is not the scan period SP, the scan start signal may not be activated, and accordingly, the horizontal count value H COUNT may not be reset. The horizontal count value H COUNT of the horizontal cycle following the last horizontal cycle of the scan period SP may be 2041, which exceeds the reference value of 2040, and accordingly, the driving controller 200 may determine the current frame period as the hold period HP.

Referring to FIG. 12, the scan period SP may be divided into an active period AP and a vertical blank period VBP. The hold periods HP may be the vertical blank periods VBP. The driving controller 200 may not count a blank count value VB COUNT in the active period AP, and the driving controller 200 may count a blank count value VB COUNT in the vertical blank period VBP. When the blank count value VB COUNT exceeds a reference value, the driving controller 200 may determine the current frame period as the hold period HP. The reference value may have a preset value to determine whether the current frame period is the scan period SP or the hold period HP. The driving controller 200 may not count the number of pulses of the horizontal synchronization signal in the active period AP, and the blank count value VB COUNT may be a value obtained by counting the number of pulses of the horizontal synchronization signal by the driving controller 200 in the vertical blank period VBP.

The driving controller 200 may generate a blank count value VB COUNT by counting the number of pulses of the horizontal synchronization signal, and may determine the current frame period as the hold period when the blank count value VB COUNT exceeds the reference value. Therefore, when the count value is the reference value or less, the driving controller 200 may determine the current frame period as the scan period.

When the vertical blank start signal having an activation pulse at the beginning of the vertical blank period VBP is activated, the driving controller 200 may count the horizontal synchronization signals.

Until the vertical blank start signal is activated after the scan start signal is activated, the driving controller 200 may not count the horizontal synchronization signals.

When a scan start signal having an activation pulse at the beginning of the scan period SP is activated, the driving controller 200 may reset the blank count value VB COUNT.

In an embodiment, for example, as shown in FIG. 12, for the same amount of time, the display panel 100 driven at a driving frequency DF of about 240 Hz may have 2.5 frame periods FP1, and the display panel 100 driven at a driving frequency DF of about 96 Hz may have one frame period FP3. The number of pulses of the horizontal synchronization signal of the frame period FP1 corresponding to the driving frequency DF of about 240 Hz may be 2040, and the blank count value VB COUNT in the last horizontal cycle of the frame period FP1 may be 240. The number of pulses of the horizontal synchronization signal of the frame period FP3 corresponding to the driving frequency DF of about 96 Hz may be 5100, and the blank count value VB COUNT in the last horizontal cycle of the frame period FP3 may be 3300. The number of pulses of the horizontal synchronization signal in one scan period SP may be 2040, and the blank count value VB COUNT may be 240 at most. In one hold period HP, the number of pulses of the horizontal synchronization signal may be 2040, and the blank count value VB COUNT may exceed 240. At a driving frequency DF of about 240 Hz, the driving controller 200 may generate the blank count value VB COUNT of 240 in the last horizontal cycle of the vertical blank period VBP, and when the scan start signal is activated at the beginning of the scan period SP (a first horizontal cycle of the scan period SP), the driving controller 200 may reset the blank count value VB COUNT. At the driving frequency DF of 240 Hz, since the blank count value VB COUNT is 1 at least and 240 at most, which is always the reference value of 240 or less, the driving controller 200 may determine the current frame period as the scan period SP.

When the driving frequency DF is about 96 Hz and the previous frame period is the scan period SP, the blank count value VB COUNT of 240 may be generated in the last horizontal cycle of the vertical blank period VBP. At the driving frequency DF of 96 Hz, since the horizontal cycle following the last horizontal cycle of the scan period SP is not the scan period SP, the scan start signal may not be activated, and accordingly, the blank count value VB COUNT may not be reset. Since the count value of the horizontal cycle following the last horizontal cycle of the scan period SP is 241 and exceeds the reference value of 240, the driving controller 200 may determine the current frame period as the hold period HP.

Figure 13:
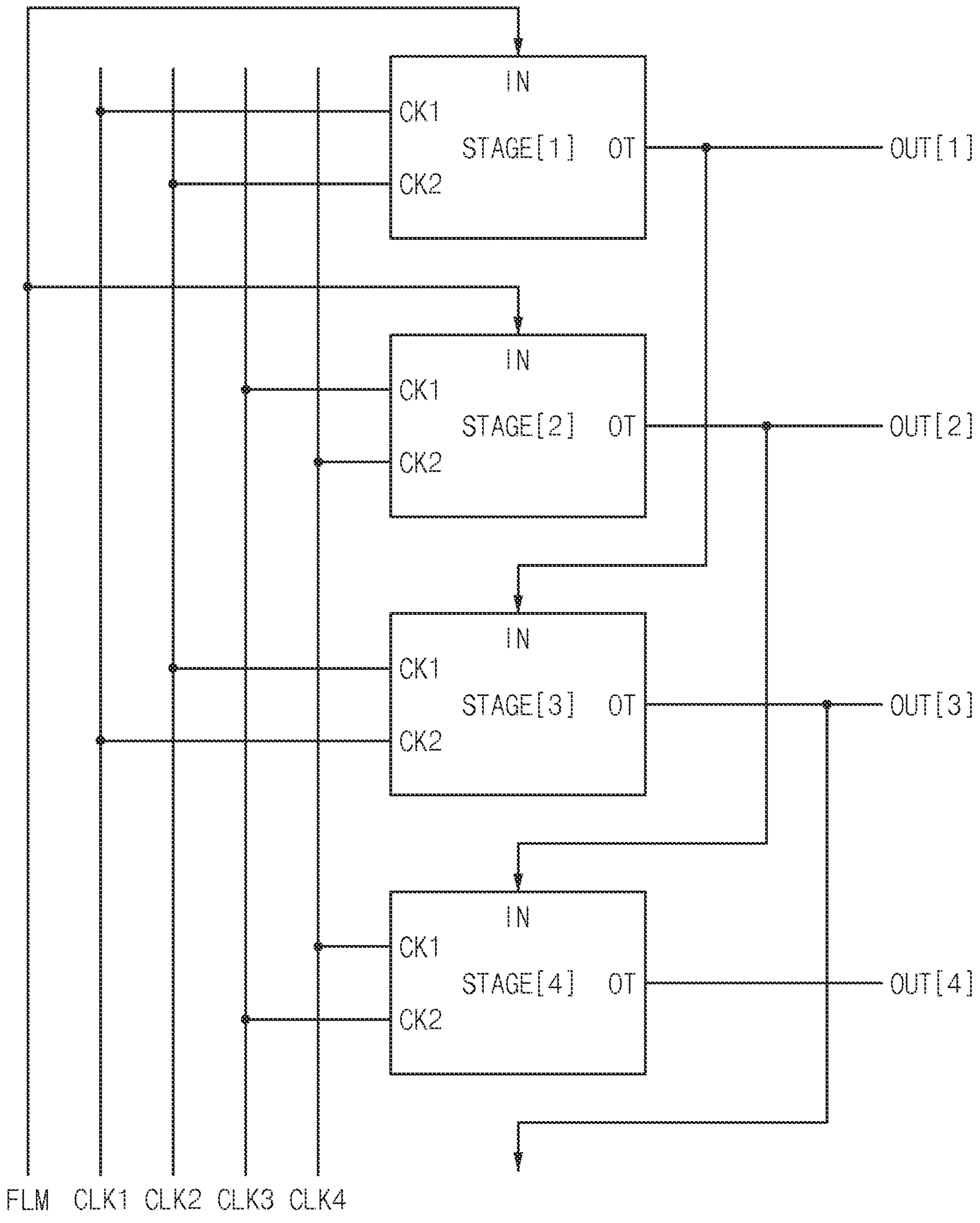
FIG. 13 is a block diagram illustrating an embodiment of the gate driver of FIG. 1.

FIG. 13 is a block diagram illustrating an embodiment of the gate driver of FIG. 1.

Referring to FIG. 13, in an embodiment, the gate driver 300 may include a shift register including stages, e.g., first to n-th stages STAGE[1], STAGE[2], STAGE[3], STAGE [4], . . . , and STAGE[n]. Here, n is a natural number.

Each of the stages STAGE[1], STAGE[2], STAGE[3], STAGE[4], . . . , and STAGE[n] may include an input terminal IN, clock terminals CK1 and CK2, and an output terminal OT.

In the first stage STAGE[1], a frame line mark (FLM) signal FLM may be applied to the input terminal IN, first and second clock signals CLK1 and CLK2 may be applied to the clock terminals CK1 and CK2, and a first output signal OUT[1] may be output to the output terminal OT. The first stage STAGE[1] may receive the FLM signal FLM as an input signal, may be controlled by the first and second clock signals CLK1 and CLK2 and may output the first output signal OUT[1].

When the FLM signal FLM has an active level, the first stage STAGE[1] may determine an output timing of the first output signal OUT[1], and the first stage STAGE[1] at which the output timing is determined may output the first output signal OUT[1] in response to the first and second clock signals CLK1 and CLK2.

The first output signal OUT[1] may be used as a carry signal of the third stage STAGE[3] and an anode initialization signal GB of a first pixel row. The first output signal OUT[1] used as the carry signal of the third stage STAGE[3] may be applied to the input terminal IN of the third stage STAGE[3]. When the output anode initialization signal GB has an active level, a seventh transistor T7 of a pixel of the first pixel row may perform an anode initialization operation in which an anode initialization voltage VAINT is applied to an anode electrode of a light emitting element EL of the pixel of the first pixel row in response to the anode initialization signal GB.

In the second stage STAGE[2], the FLM signal FLM may be applied to the input terminal IN, third and fourth clock signals CLK3 and CLK4 may be applied to the clock terminals CK1 and CK2, and a second output signal OUT[2] may be output to the output terminal OT. The second stage STAGE[2] may receive the FLM signal FLM as an input signal, may be controlled by the third and fourth clock signals CLK3 and CLK4 and may output the second output signal OUT[2].

When the FLM signal FLM used as a carry signal of the second stage STAGE[2] has an active level, the second stage STAGE[2] may determine an output timing of the second output signal OUT[2], and the second stage STAGE[2] at which the output timing is determined may output the second output signal OUT[2] in response to the third and fourth clock signals CLK3 and CLK4.

The second output signal OUT[2] may be used as a carry signal of the fourth stage STAGE[4] and an anode initialization signal GB of a second pixel row. The second output signal OUT[2] used as the carry signal of the fourth stage STAGE[4] may be applied to the input terminal IN of the fourth stage STAGE[4]. When the output anode initialization signal GB has an active level, a seventh transistor T7 of a pixel of the second pixel row may perform an anode initialization operation in which an anode initialization voltage VAINT is applied to an anode of a light emitting element EL of the pixel of the second pixel row in response to the anode initialization signal GB.

In the third stage STAGE[3], the first output signal OUT[1] may be applied to the input terminal IN, the second and first clock signals CLK2 and CLK1 may be applied to the clock terminals CK1 and CK2, and a third output signal OUT[3] may be output to the output terminal OT.

In the fourth stage STAGE[4], the second output signal OUT[2] may be applied to the input terminal IN, the fourth and third clock signals CLK4 and CLK3 may be applied to the clock terminals CK1 and CK2, and a fourth output signal OUT[4] may be output to the output terminal OT.

Each operation of odd-numbered stages STAGE[5], STAGE[7], . . . among subsequent stages STAGE[5], STAGE[6], . . . , and STAGE[n] is substantially the same as the operation of the first stage STAGE[1] and the operation of the third stage STAGE[3].

Each operation of even-numbered stages STAGE[6], STAGE[8], . . . among subsequent stages STAGE[5], STAGE[6], . . . , and STAGE[n] is substantially the same as the operation of the second stage STAGE[2] and the operation of the fourth stage STAGE[4]. Therefore, redundant descriptions of the same or corresponding components will be omitted.

The stages STAGE[1], STAGE[2], STAGE[3], STAGE [4], . . . , and STAGE[n] may sequentially apply the output signals OUT[1], OUT[2], OUT[3], OUT[4], . . . , and OUT[n] used as the anode initialization signal GB to the pixel rows.

Figure 14:
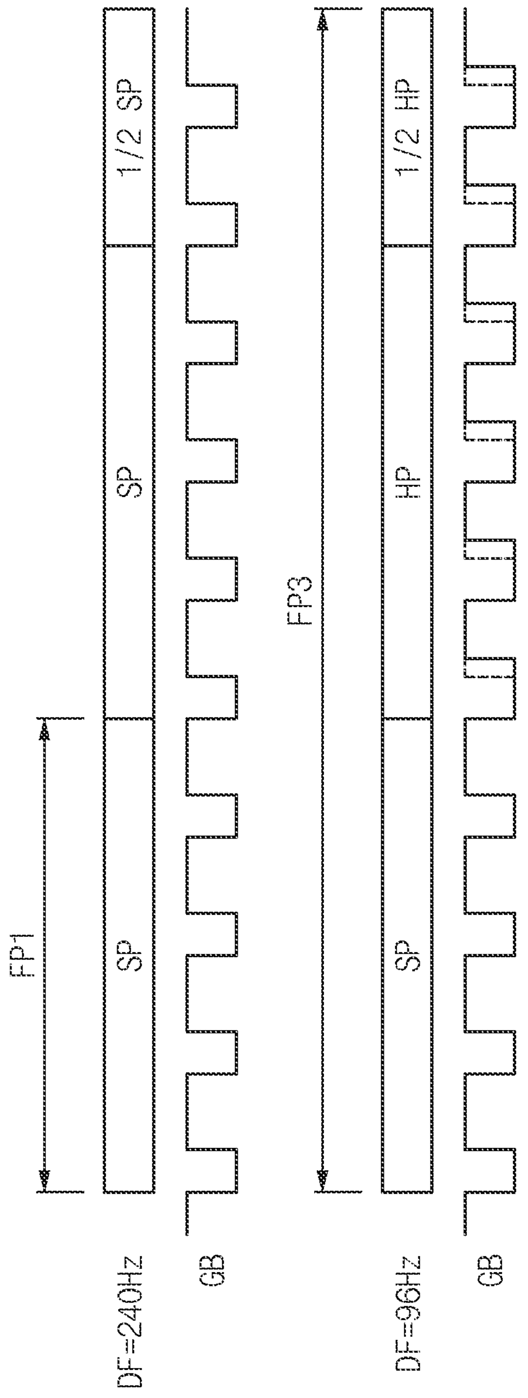
FIG. 14 is a timing diagram illustrating an example of an operation of the gate driver of FIG. 13 in the scan period and the hold period.
Figure 15:
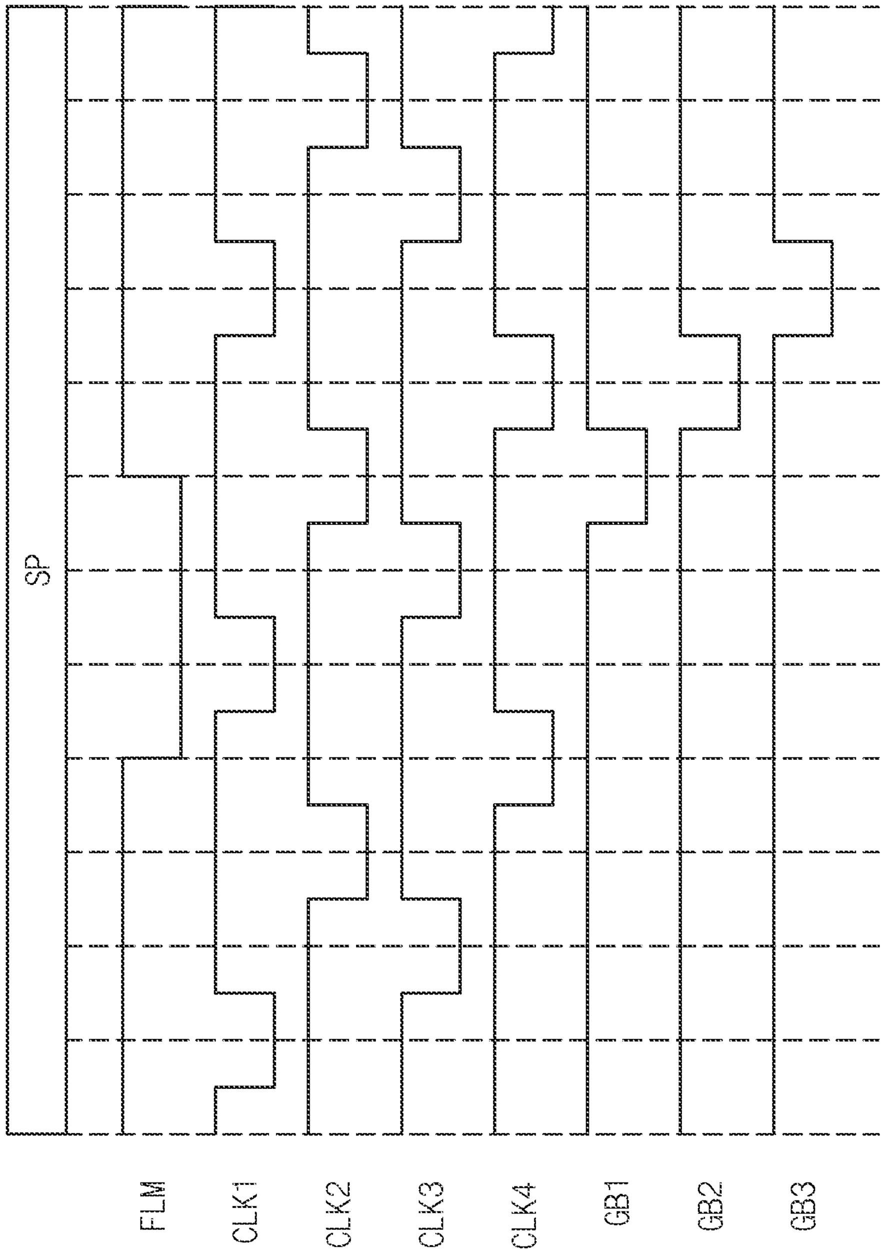
FIG. 15 is a signal timing diagram illustrating the operation of the gate driver of FIG. 14 in the scan period.
Figure 16:
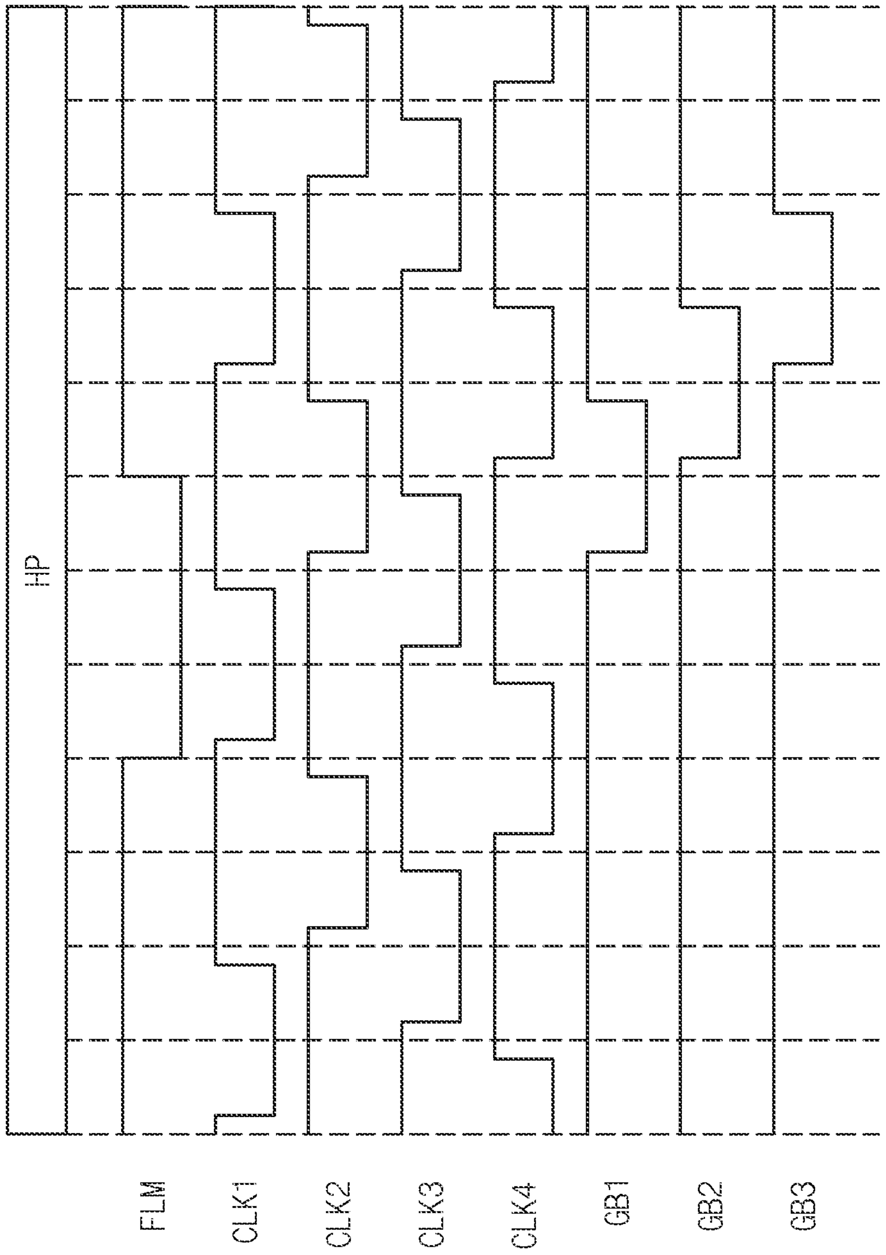
FIG. 16 is a signal timing diagram illustrating the operation of the gate driver of FIG. 14 in the hold period.

FIG. 14 is a timing diagram illustrating an example of an operation of the gate driver of FIG. 13 in the scan period and the hold period. FIG. 15 is a signal timing diagram illustrating the operation of the gate driver of FIG. 14 in the scan period. FIG. 16 is a signal timing diagram illustrating the operation of the gate driver of FIG. 14 in the hold period.

In the scan period SP and the hold period HP, the FLM signal FLM may determine the output timing of the anode initialization signal GB, and the gate driver 300 may sequentially output the anode initialization signal GB to the pixel rows in response to the first to fourth clock signals CLK1, CLK2, CLK3 and CLK4.

The increase in luminance in the hold period HP may be effectively prevented or substantially reduced, and as shown in FIG. 14, the time length of the anode initialization signal GB in the hold periods HP may be longer than the time length of the anode initialization signal GB in the scan period SP to prevent or reduce the luminance difference at different driving frequencies.

Referring to FIG. 15, in the scan period SP, the shift register may output anode initialization signals GB that do not overlap each other. In an embodiment, the time length of the anode initialization signal GB in the scan period SP may correspond to 1 horizontal period (1H). However, the present disclosure is not limited thereto.

Referring to FIG. 16, the increase in luminance in the hold period HP may be effectively prevented or substantially reduced, and the luminance difference at different driving frequencies may be prevented or reduced, and the shift register may output anode initialization signals GB overlapping each other for a predetermined time to secure enough time in the hold periods HP. In an embodiment, a width of the anode initialization signal GB in the hold periods HP may correspond to 2 horizontal periods (2H). However, the present disclosure is not limited thereto.

In such an embodiment, the sequentially delayed first and second clock signals CLK1 and CLK2 may be alternately applied to the clock terminals CK1 and CK2 of each odd-numbered stages STAGE[1], STAGE[3], . . . , and the sequentially delayed third and fourth clock signals CLK3 and CLK4 may be alternately applied to the clock terminals CK1 and CK2 of each even-numbered stages STAGE[2], STAGE[4], . . . .

In an embodiment, widths of the first to fourth clock signals CLK1, CLK2, CLK3, and CLK4 may overlap each other by 2 horizontal periods (2H), and the first to fourth clock signals CLK1, CLK2, CLK3, and CLK4 sequentially delayed by 1 horizontal period (1H) may be input. However, the present disclosure is not limited thereto.

Figure 17:
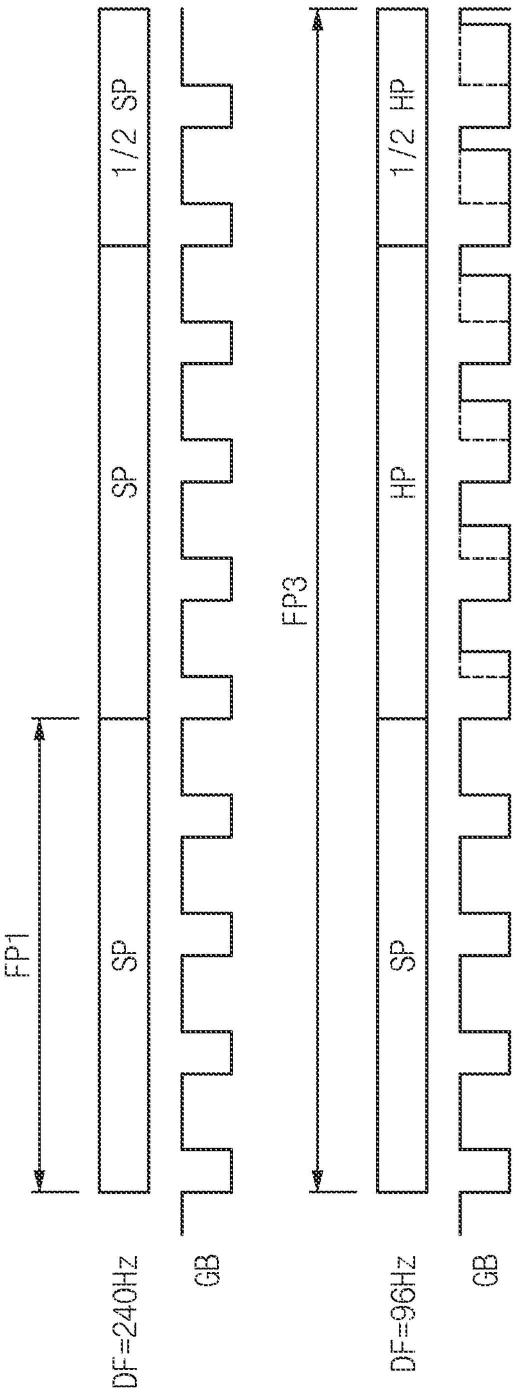
FIG. 17 is a timing diagram illustrating another example of the operation of the gate driver of FIG. 13 in the scan period and the hold period.

FIG. 17 is a timing diagram illustrating another example of the operation of the gate driver of FIG. 13 in the scan period and the hold period.

Referring to FIG. 17, in an embodiment, the time length of the anode initialization signal GB in the hold periods HP may be gradually increased every hold period.

When the time during which the pixel performs the anode initialization operation is gradually increased in the hold periods HP, the degree of discharge of the parasitic capacitor CEL of the light emitting element EL by the anode initialization operation in the hold periods HP may be gradually increased, the amount of current used to charge the parasitic capacitor CEL discharged in the hold periods HP may be gradually increased, and the timing at which the pixel starts to emit light in the hold periods HP may be gradually delayed.

Figure 18:
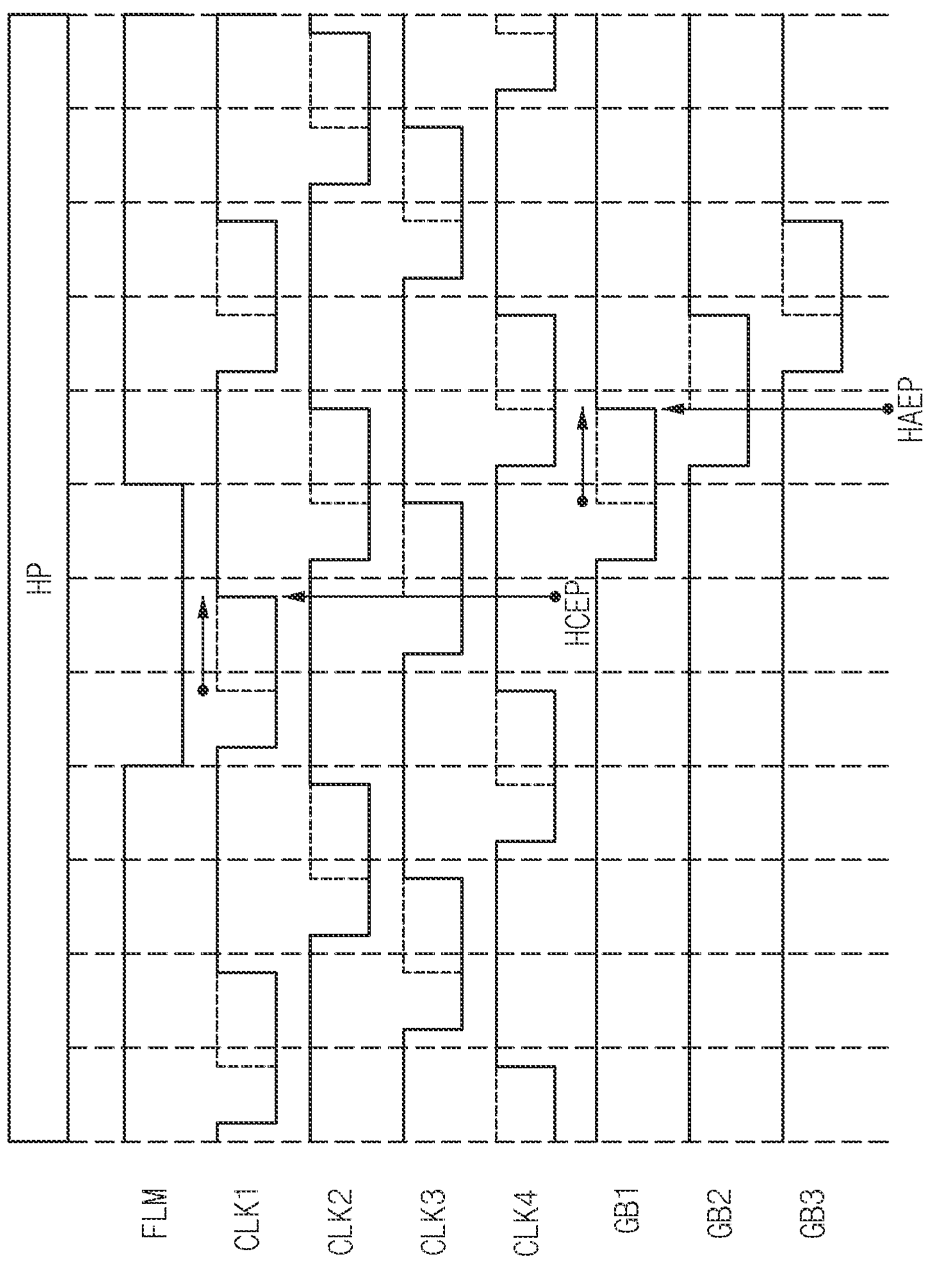
FIG. 18 is a signal timing diagram illustrating an example of performing the operation of the gate driver of FIG. 14 in the hold period.
Figure 19:
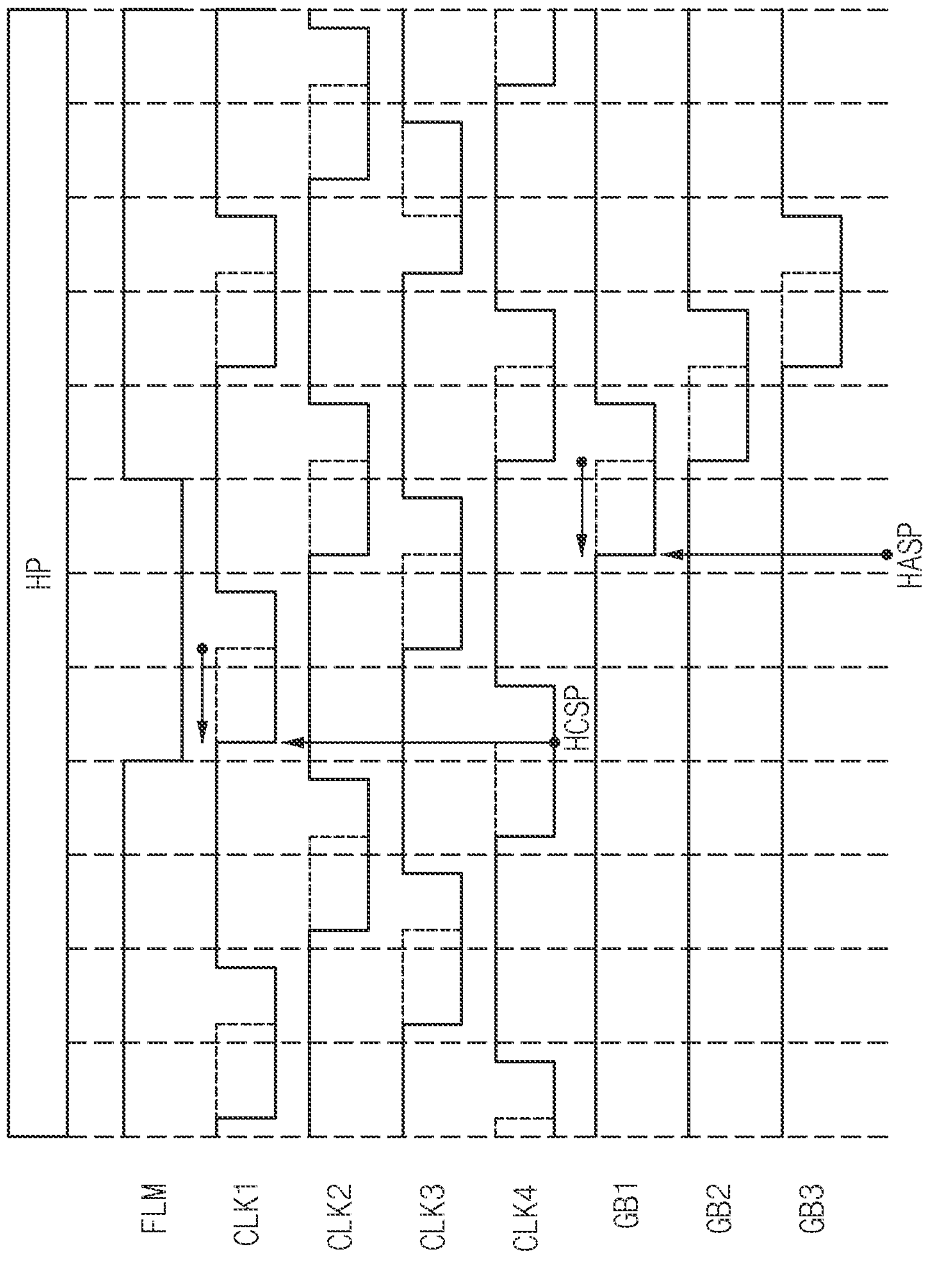
FIG. 19 is a signal timing diagram illustrating another example of performing the operation of the gate driver of FIG. 14 in the hold period.
Figure 20:
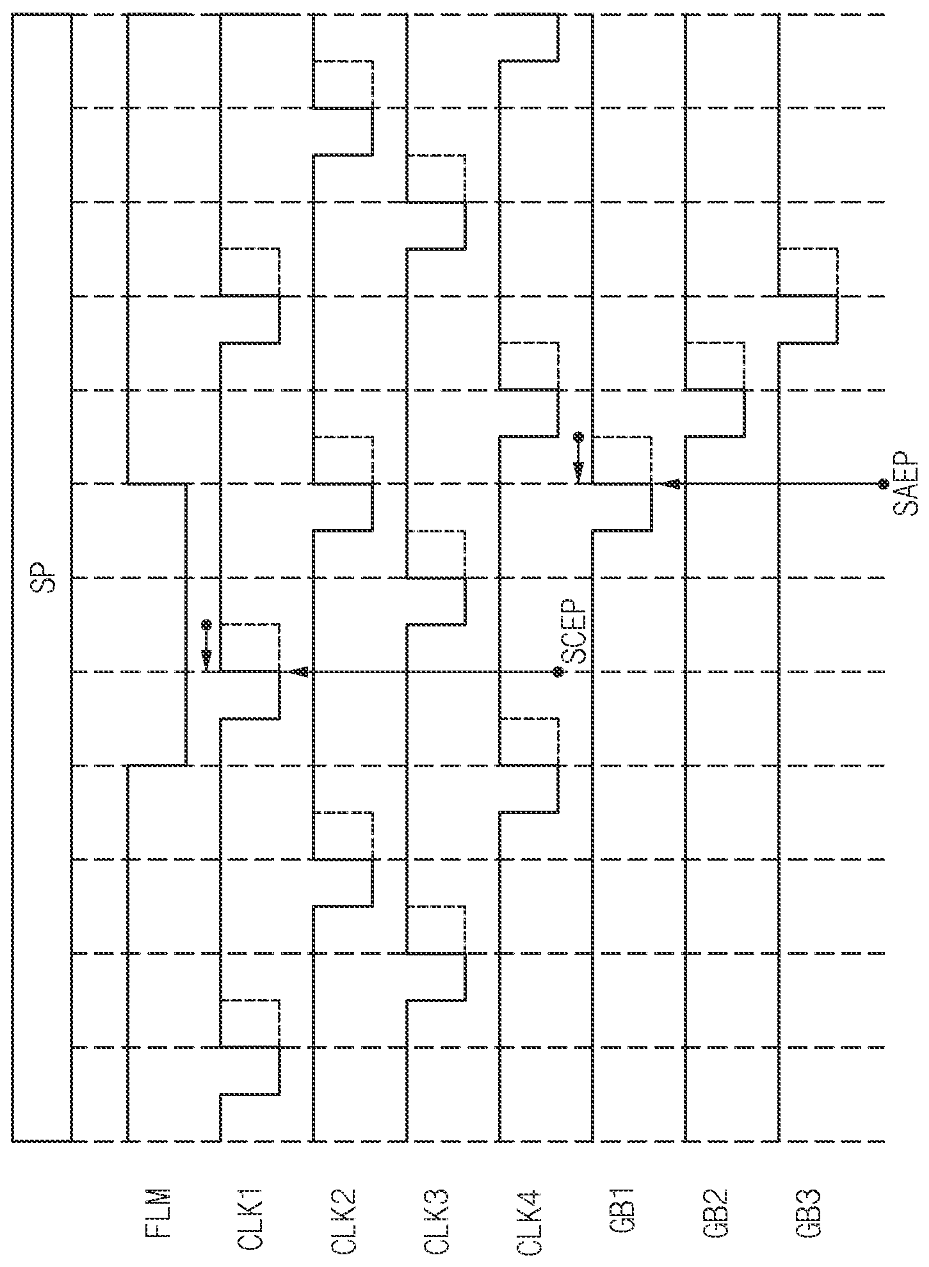
FIG. 20 is a signal timing diagram illustrating an example of performing the operation of the gate driver of FIG. 14 in the scan period.
Figure 21:
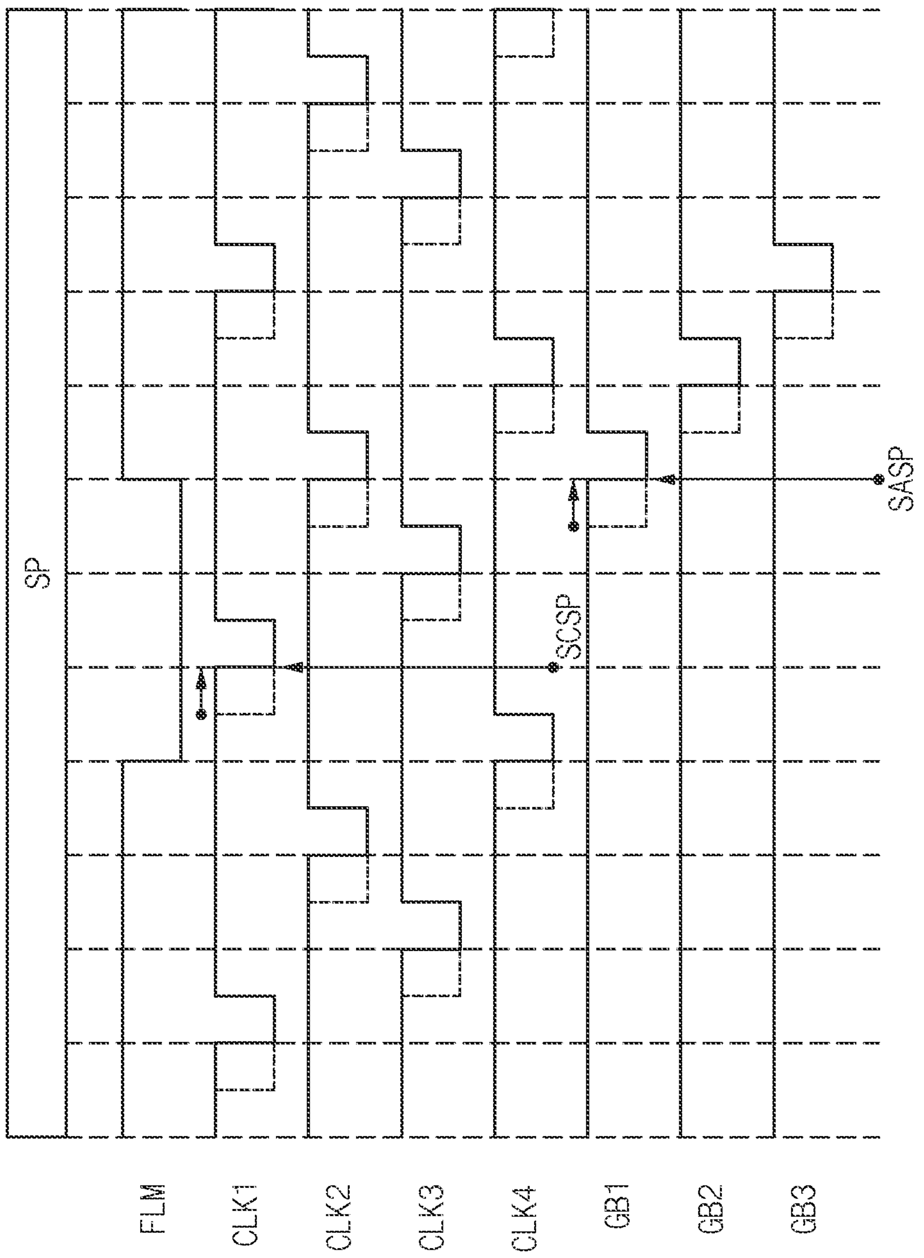
FIG. 21 is a signal timing diagram illustrating another example of performing the operation of the gate driver of FIG. 14 in the scan period.

FIG. 18 is a signal timing diagram illustrating an example of performing the operation of the gate driver of FIG. 14 in the hold period. FIG. 19 is a signal timing diagram illustrating another example of performing the operation of the gate driver of FIG. 14 in the hold period. FIG. 20 is a signal timing diagram illustrating an example of performing the operation of the gate driver of FIG. 14 in the scan period. FIG. 21 is a signal timing diagram illustrating another example of performing the operation of the gate driver of FIG. 14 in the scan period.

Referring to FIG. 18, end points HCEP of pulses of the clock signals CLK1, CLK2, CLK3, and CLK4 in the hold period HP may be adjusted, thereby adjusting an end point HAEP of the pulse of the anode initialization signal GB in the hold period HP, such that the time length of the anode initialization signal GB in each of the hold periods HP is set to be longer than the time length of the anode initialization signal GB in the scan period SP.

Referring to FIG. 19, start points HCSP of the pulses of the clock signals CLK1, CLK2, CLK3, and CLK4 in the hold period HP may be adjusted, thereby adjusting a start point HASP of the pulse of the anode initialization signal GB in the hold period HP.

Referring to FIG. 20, end points SCEP of pulses of the clock signals CLK1, CLK2, CLK3, and CLK4 in the scan period SP may be adjusted, thereby adjusting an end point SAEP of the pulse of the anode initialization signal GB in the scan period SP.

Referring to FIG. 21, start points SCSP of the pulses of the clock signals CLK1, CLK2, CLK3, and CLK4 in the scan period SP may be adjusted, thereby adjusting a start point SASP of the pulse of the anode initialization signal GB in the scan period SP.

In an embodiment, the anode initialization signal GB in the hold periods HP may be output in response to the clock signals CLK1, CLK2, CLK3, and CLK4 in the hold periods HP having a time length of P horizontal periods (P is a positive number greater than 1). However, to use only the first and second clock signals CLK1 and CLK2, the anode initialization signal GB in the hold periods HP may be output in response to the first and second clock signals CLK1 and CLK2 in the hold periods HP having a time length of a Q horizontal period (Q is a positive number of 1 or less). In addition, the output signals OUT[1], OUT[2], OUT[3], OUT[4], . . . , and OUT[n] may not overlap each other.

The stages STAGE[1], STAGE[2], STAGE[3], STAGE [4], . . . , and STAGE[n] may output the output signals OUT[1], OUT[2], OUT[3], OUT[4], . . . , and OUT[n] in response to the first and second clock signals CLK1 and CLK2. The output signals OUT[1], OUT[2], OUT[3], OUT [4], . . . , and OUT[n] may not overlap.

Figure 22:
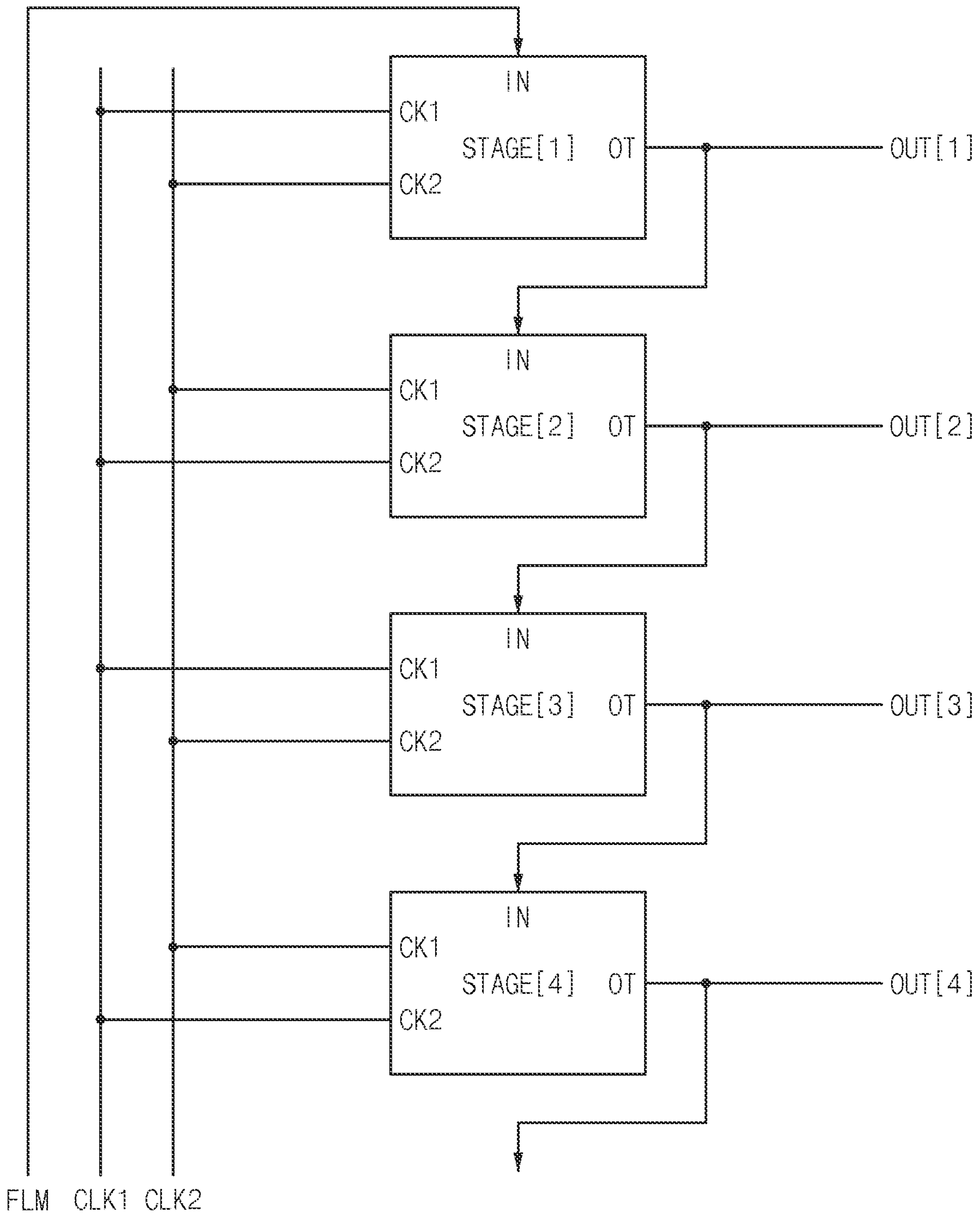
FIG. 22 is a block diagram illustrating an alternative embodiment of the gate driver of FIG. 1.
Figure 23:
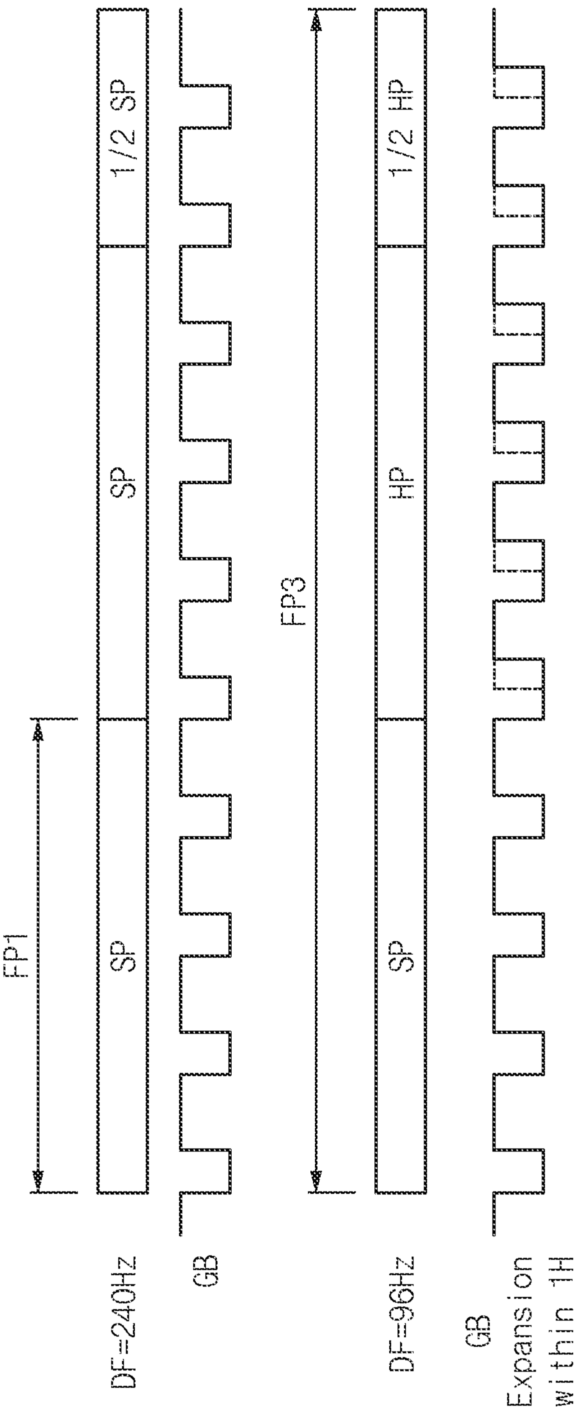
FIG. 23 is a timing diagram illustrating an example of the operation of the gate driver of FIG. 22 in the scan period and the hold period.

FIG. 22 is a block diagram illustrating an alternative embodiment of the gate driver of FIG. 1. FIG. 23 is a timing diagram illustrating an example of the operation of the gate driver of FIG. 22 in the scan period and the hold period.

Referring to FIG. 22, an embodiment of the gate driver 300 may include a shift register including stages STAGE[1], STAGE[2], STAGE[3], STAGE[4], . . . , and STAGE[n]. The shift register of FIG. 22 is substantially the same as the shift register of FIG. 13 except that the first output signal OUT[1] is applied to the input terminal IN of the second stage STAGE[2], first and second clock signals CLK1 and CLK2 are alternately input to the clock terminals CK1 and CK2 of the odd-numbered stages STAGE[1], STAGE[3], . . . and the even-numbered stages STAGE[2], STAGE[4], . . . , and the output signals of the previous stages are applied to the input terminals IN of the subsequent stages STAGE[2], STAGE[3], STAGE[4], . . . , and STAGE[n] of the first stage STAGE[1]. Therefore, any repetitive detailed descriptions of the same or corresponding components as those described above will be omitted.

The increase in luminance in the hold period HP and the difference in luminance at different driving frequencies may be effectively prevented or substantially reduced due to a relative difference between the time length of the anode initialization signal GB in the scan period SP and the time length of the anode initialization signal GB in the hold periods HP. Accordingly, even when the discharge degree of the parasitic capacitor CEL is small because the time length of the anode initialization signal GB in the hold periods HP is short, the anode initialization signal GB in the hold periods HP may have a time length of the Q horizontal period (Q is a positive number of 1 or less), and the time length of the anode initialization signal GB in each of the hold periods HP may be longer than the time length of the anode initialization signal GB in the scan period SP.

Figure 24:
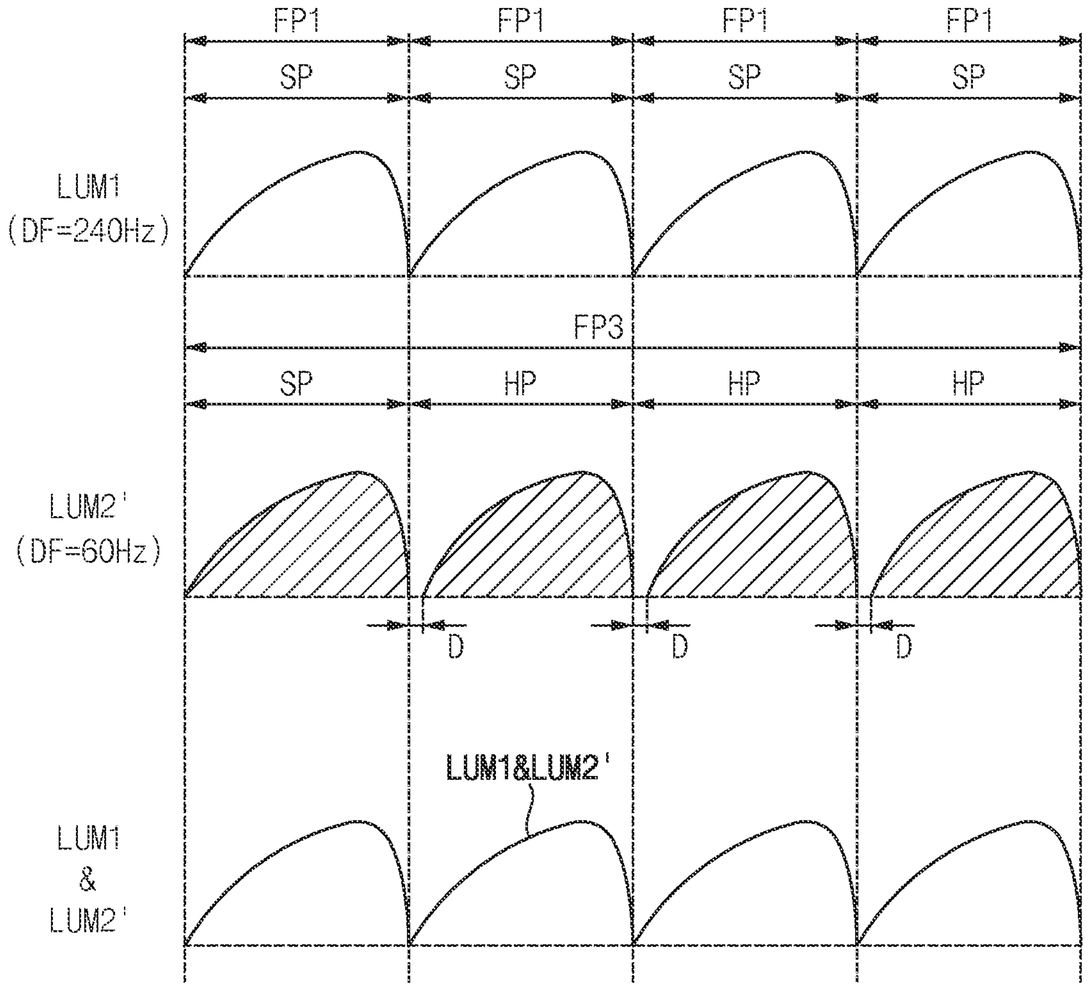
FIG. 24 is a diagram illustrating an example of luminance of the display panel driven at driving frequencies of about 240 Hz and about 60 Hz in the display device.
Figure 25:
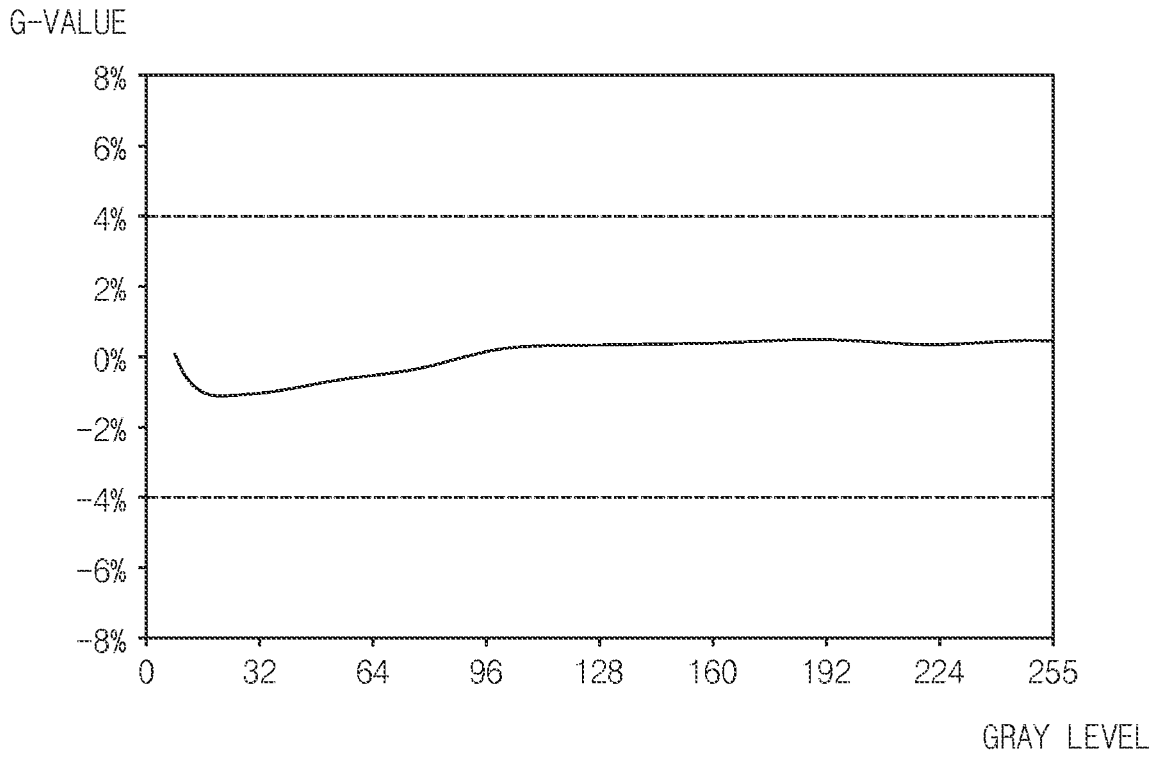
FIG. 25 is a diagram illustrating an example of a G-value of the display device.

FIG. 24 is a diagram illustrating an example of luminance of the display panel driven at driving frequencies of about 240 Hz and about 60 Hz in the display device. FIG. 25 is a diagram illustrating an example of a G-value of the display device.

FIG. 24 shows a light waveform LUM2' of the display panel 100 in which the pixel performs the anode initialization operation in the hold periods HP. In an embodiment, as shown in FIG. 24, the timing at which the display panel 100 (or the pixel of the display panel 100) starts to emit light in the hold period HP may be delayed by a delay time D. Accordingly, even when the distortion of the data voltage VDATA due to the leakage current of the pixel is accumulated as the hold periods HP continues, the timing at which each pixel starts to emit light may be delayed by the delay time D in the hold periods HP, so that the increase in the luminance of the display panel 100 in the hold period HP may be prevented or reduced, and the difference in luminance at different driving frequencies DF may be prevented or reduced. In an embodiment, for example, as shown in FIG. 24, a light waveform LUM2' of a display panel 110 driven at a driving frequency DF of about 60 Hz may be substantially the same as the light waveform LUM1 of the display panel 100 driven at a driving frequency DF of about 240 Hz. In an embodiment, when the anode initialization voltage VAINT is set to correspond to the sum of the power supply voltage ELVSS and the threshold voltage of the light emitting element EL, the pixel in the scan period SP may start to emit light without delay, and the luminance reduction effect due to the delay in the light emission start timing in the hold period HP may be increased.

In FIG. 25, the G-value of the display device according to the embodiments of the present disclosure may not only have an absolute value of about 4% or less in excess of 60-grayscale, and but have an absolute value of about 4% or less in 60-grayscale or less. In other words, in the variable frequency mode, the display device according to the embodiments of the present disclosure may have a small luminance difference at different driving frequencies (or different frame frequencies), and flicker may not occur (or not be visually recognized) when the driving frequency (or frame frequency) of the display panel 100 is changed.

Figure 26:
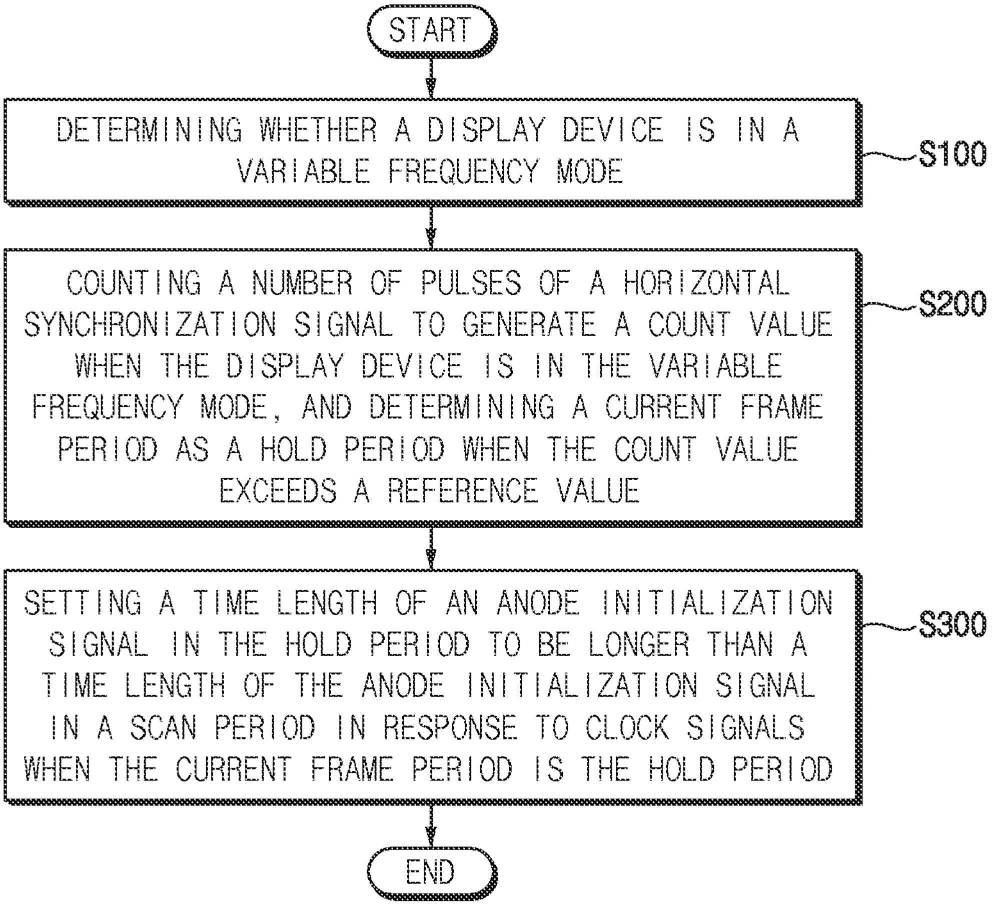
FIG. 26 is a flowchart illustrating an embodiment of a method of driving the display device.

FIG. 26 is a flowchart illustrating an embodiment of a method of driving the display device.

Referring to FIG. 26, an embodiment of the method of driving the display device may include determining whether a display device 10 is in a variable frequency mode (S100), counting the number of pulses of a horizontal synchronization signal to generate a count value when the display device 10 is in the variable frequency mode, and determining a current frame period as a hold period when the count value exceeds a reference value (S200), and setting a time length of the anode initialization signal in the hold period HP to be longer than a time length of an anode initialization signal in a scan period SP in response to clock signals when the current frame period is the hold period HP (S300).

The method of driving the display device of FIG. 26 is substantially the same as the display device 10 described with reference to FIGS. 1 to 25. Therefore, any repetitive detailed descriptions of the same or corresponding components as those described above will be omitted.

In an embodiment, when entering the current frame period, which is the scan period SP, from the previous frame period, which is the scan period SP, the driving controller 200 may reset the count value.

In an embodiment, when entering the hold period HP from the scan period SP, the driving controller 200 may count the count value without resetting the count value.

In an embodiment, the clock signals may include first to fourth clock signals CLKT, CLK2, CLK3, and CLK4, anode initialization signals may be sequentially applied to odd-numbered pixel rows in response to the first and second clock signals CLK1 and CLK2, and the anode initialization signals may be sequentially applied to even-numbered pixel rows in response to the third and fourth clock signals.

Figure 27:
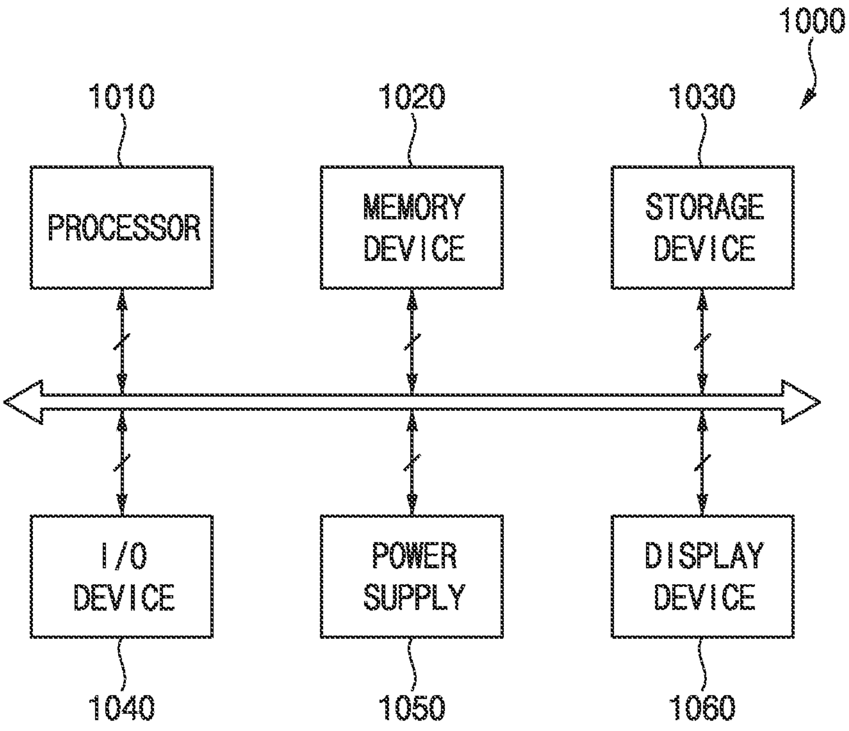
FIG. 27 is a block diagram illustrating an embodiment of an electronic device.
Figure 28:
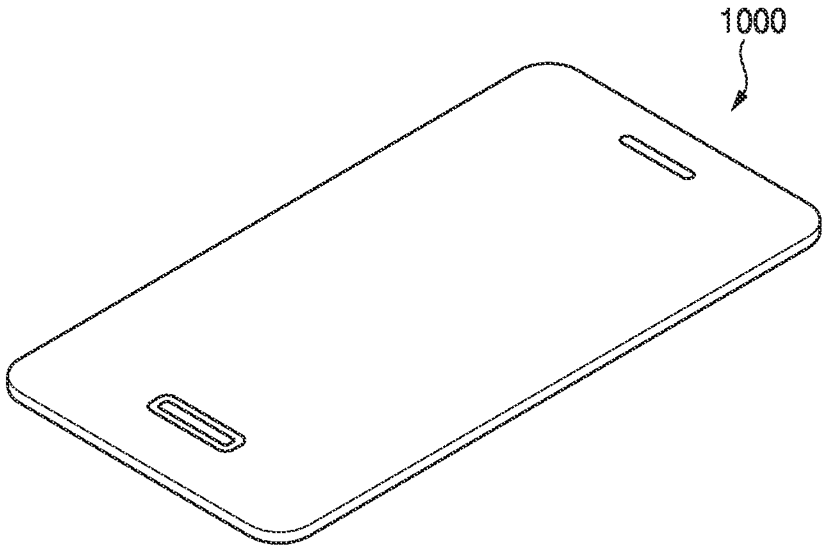
FIG. 28 is a diagram illustrating an embodiment in which the electronic device of FIG. 27 is implemented as a smart phone.

FIG. 27 is a block diagram illustrating an embodiment of an electronic device. FIG. 28 is a diagram illustrating an embodiment in which the electronic device of FIG. 27 is implemented as a smart phone.

Referring to FIGS. 27 and 28, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 28, the electronic device 1000 may be implemented as a smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, and the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. Embodiments of the inventions may be applied to a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a pixel;

a gate driver which applies an anode initialization signal to the pixel; and a driving controller which receives a horizontal synchronization signal, receives input image data at a variable frame frequency, and controls the gate driver, wherein a frame period for the display panel includes a scan period or one or more hold periods, wherein the driving controller generates a count value by counting a number of pulses of the horizontal synchronization signal, and determines a current frame period as a hold period when the count value exceeds a reference value, and wherein a time length of the anode initialization signal in each of the one or more hold periods is longer than a time length of the anode initialization signal in the scan period.

2. The display device of claim 1, wherein the driving controller determines the frame period for the display panel based on the variable frame frequency in a way such that a time length of the frame period is N times of a time length of a minimum frame period, wherein N is a positive number greater than 1, and wherein the frame period includes one scan period having a time length substantially the same as the time length of the minimum frame period and N−1 hold periods, each having a time length substantially the same as the time length of the minimum frame period.

3. The display device of claim 1, wherein, when the count value is less than or equal to the reference value, the driving controller determines the current frame period as the scan period.

4. The display device of claim 1, wherein, in the scan period and the one or more hold periods, the driving controller counts the number of the pulses of the horizontal synchronization signal.

5. The display device of claim 4, wherein, when a scan start signal having an activation pulse at a beginning of the scan period is activated, the driving controller resets the count value.

6. The display device of claim 1, wherein the scan period includes an active period and a vertical blank period, and each of the one or more hold period includes the vertical blank period, wherein the driving controller does not count the horizontal synchronization signal in the active period, and counts the horizontal synchronization signal in the vertical blank period to generate the count value, and wherein the driving controller determines the current frame period as the hold period when the count value exceeds the reference value.

7. The display device of claim 6, wherein, when a vertical blank start signal having an activation pulse at a beginning of the vertical blank period is activated, the driving controller starts to count the horizontal synchronization signal.

8. The display device of claim 6, wherein, when a scan start signal having an activation pulse at a beginning of the scan period is activated, the driving controller resets the count value.

9. The display device of claim 6, wherein, until a vertical blank start signal is activated after a scan start signal is activated, the driving controller does not count the horizontal synchronization signal.

10. The display device of claim 1, wherein the gate driver applies the anode initialization signal to the pixel in response to clock signals, wherein the clock signals include first to fourth clock signals, and wherein the gate driver includes a shift register including stages which sequentially apply the anode initialization signals to odd-numbered pixel rows in response to the first and second clock signals, and sequentially apply the anode initialization signals to even-numbered pixel rows in response to the third and fourth clock signals.

11. The display device of claim 1, wherein the time length of the anode initialization signal in the one or more hold periods is gradually increased every hold period.

12. The display device of claim 1, wherein the gate driver applies the anode initialization signal to the pixel in response to clock signals, and wherein start points of pulses of the anode initialization signal in one hold period are adjusted by adjusting start points of pulses of the clock signals in the one hold period, or wherein end points of the pulses of the anode initialization signal in the one hold period are adjusted by adjusting end points of the pulses of the clock signals in the one hold period.

13. The display device of claim 1, wherein the gate driver applies the anode initialization signal to the pixel in response to clock signals, and wherein start points of pulses of the anode initialization signal in the scan period are adjusted by adjusting start points of pulses of the clock signals in the scan period, or wherein end points of the pulses of the anode initialization signal in the scan period are adjusted by adjusting end points of the pulses of the clock signals in the scan period.

14. The display device of claim 1, wherein the anode initialization signal in the one or more hold periods is output in response to clock signals in the one or more hold periods, and wherein the clock signals have a time length of P horizontal periods, wherein P is a positive number greater than 1.

15. The display device of claim 1, wherein the anode initialization signal in the one or more hold periods is output in response to clock signals in the one or more hold periods, and wherein the clock signals have a time length of a Q horizontal period, wherein Q is a positive number 1 or less.

16. The display device of claim 1, wherein the pixel includes:

a first capacitor connected between a line of a first power supply voltage and a first node;

a second capacitor connected between the first node and a second node;

a first transistor including a gate electrode connected to the second node;

a second transistor which applies a data voltage to the first node in response to a write signal;

a third transistor which diode-connects the first transistor in response to a compensation signal;

a fourth transistor which applies a gate initialization voltage to the second node in response to a gate initialization signal;

a fifth transistor which applies a reference voltage to the first node in response to the compensation signal;

a sixth transistor which connects the first transistor to a light emitting element in response to a light emission signal;

a seventh transistor which applies an anode initialization voltage to an anode electrode of the light emitting element in response to the anode initialization signal; and the light emitting element including the anode electrode and a cathode electrode connected to a line of a second power supply voltage.

17. The display device of claim 1, wherein the scan period includes a gate initialization period in which the pixel performs a gate initialization operation, a threshold voltage compensation period in which the pixel performs a threshold voltage compensation operation, a data write period in which the pixel performs a data write operation, an anode initialization period in which the pixel performs an anode initialization operation, and a light emission period in which the pixel performs a light emission operation, and wherein each of the one or more hold periods includes:

the anode initialization period in which the pixel performs the anode initialization operation; and the light emission period in which the pixel performs the light emission operation.

18. A method of driving a display device, the method comprising:

determining whether a display device is in a variable frequency mode;

counting a number of pulses of a horizontal synchronization signal to generate a count value when the display device is in the variable frequency mode, and determining a current frame period as a hold period when the count value exceeds a reference value; and setting a time length of an anode initialization signal in the hold period to be longer than a time length of the anode initialization signal in a scan period in response to clock signals when the current frame period is the hold period.

19. The method of claim 18, wherein, when a scan start signal having an activation pulse at a beginning of the scan period is activated, the count value is reset.

20. The method of claim 18, wherein the clock signals include first to fourth clock signals, wherein the anode initialization signal is sequentially applied to odd-numbered pixel rows in response to the first and second clock signals, and wherein the anode initialization signal is sequentially applied to even-numbered pixel rows in response to the third and fourth clock signals.

* * * * *